(12) United States Patent
Naser et al.

(10) Patent No.: US 11,539,951 B2
(45) Date of Patent: Dec. 27, 2022

(54) METHOD AND DEVICE FOR PICTURE ENCODING AND DECODING

(71) Applicant: InterDigital VC Holdings, Inc., Wilmington, DE (US)

(72) Inventors: Karam Naser, Mouazé (FR); Fabrice Leleannec, Betton (FR); Tangi Poirier, Thorigné-Fouillard (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 17/296,729

(22) PCT Filed: Dec. 2, 2019

(86) PCT No.: PCT/US2019/063913
§ 371 (c)(1),
(2) Date: May 25, 2021

(87) PCT Pub. No.: WO2020/117628
PCT Pub. Date: Jun. 11, 2020

(65) Prior Publication Data
US 2022/0030238 A1 Jan. 27, 2022

(30) Foreign Application Priority Data

Dec. 3, 2018 (EP) .................................. 18306603
Dec. 5, 2018 (EP) .................................. 18306619

(51) Int. Cl.
| | | |
|---|---|---|
| *H04N 19/12* | (2014.01) | |
| *H04N 19/176* | (2014.01) | |
| *H04N 19/18* | (2014.01) | |
| *H04N 19/60* | (2014.01) | |

(52) U.S. Cl.
CPC .......... *H04N 19/12* (2014.11); *H04N 19/176* (2014.11); *H04N 19/18* (2014.11); *H04N 19/60* (2014.11)

(58) Field of Classification Search
CPC ...... H04N 19/12; H04N 19/176; H04N 19/18; H04N 19/60; H04N 19/625; H04N 19/96; H04N 19/119; H04N 19/122; H04N 19/70
See application file for complete search history.

(56) References Cited

U.S. PATENT DOCUMENTS

2020/0177889 A1* 6/2020 Kim .................... H04N 19/70

FOREIGN PATENT DOCUMENTS

| EP | 3389274 A1 | 10/2018 |
| WO | WO 2017165509 A1 | 9/2017 |

OTHER PUBLICATIONS

Zhao et al, "Enhanced Multiple Transform for Video Coding", Institute of Electrical and Electronics Engineers (IEEE), 2016 Data Compression Conference (DCC), Snowbird, Utah, Mar. 30, 2016, 10 pages.

(Continued)

*Primary Examiner* — Nam D Pham
(74) *Attorney, Agent, or Firm* — Condo Roccia Koptiw LLP

(57) ABSTRACT

A decoding method is presented. a type of split of a block into transform units is first decoded. A transform is then determined for each transform unit of said block responsive to said type of split. Finally, decoded transform coefficients of said transform units are inverse transformed using the determined transforms.

20 Claims, 19 Drawing Sheets

(56) References Cited

OTHER PUBLICATIONS

Anonymous, "Test Model 2 of Versatile Video Coding (VTM 2)", International Organization for Standardization ISO/IEC JTC1/SC29/WG11 Coding of Moving Pictures and Audio, Document: N17733, 11th Meeting: Ljubljana, Slovenia, Jul. 10, 2018, 22 pages.

Zhao et al, "CE6: Sub-block transform for inter blocks (CE6.1.2)", Joint Video Experts Team (JVET) of ITU-T SG 16 WP3 and ISO/IEC JTC 1/SC 29/WG 11, Document: JVET-L0358-v2, 12th Meeting: Macao, China, Oct. 3, 2018, 9 pages.

Sullivan et al, "Overview of the High Efficiency Video Coding (HEVC) Standard", Institute of Electrical and Electronics Engineers (IEEE), IEEE Transactions on Circuits and Systems for Video Technology, vol. 22, No. 12, Dec. 2012, 19 pages.

* cited by examiner (a)

(b)

(a)

(b)

(a)

(b)

METHOD AND DEVICE FOR PICTURE ENCODING AND DECODING

CROSS REFERENCE TO RELATED APPLICATIONS

This application is the national stage entry under 35 U.S.C. § 371 of International Application PCT/US2019/063913 filed Dec. 2, 2019, which was published in accordance with PCT Article 21(2) on Jun. 11, 2020, in English, and which claims the benefit of European Patent Application No. 18306603.4, filed Dec. 3, 2018 and European Patent Application No. 18306619.0, filed Dec. 5, 2018.

1. TECHNICAL FIELD

At least one of the present embodiments generally relates to a method and a device for picture encoding and decoding, and more particularly, to a method and a device for picture encoding and decoding using a transform, namely a spatial transform.

2. BACKGROUND ART

To achieve high compression efficiency, image and video coding schemes usually employ prediction and transform to leverage spatial and temporal redundancy in the video content. Generally, intra or inter prediction is used to exploit the intra or inter frame correlation, then the differences between the original image block and the predicted image block, often denoted as prediction errors, prediction residuals or predictor, are transformed, quantized and entropy coded. During encoding the original image block is usually partitioned/split into sub-blocks possibly using quad-tree partitioning. To reconstruct the video, the compressed data is decoded by inverse processes corresponding to the prediction, transform, quantization and entropy coding.

3. BRIEF SUMMARY

According to a general aspect of at least one embodiment, a method for decoding is presented, comprising:
  decoding a type of split of a block into transform units;
  determining a transform for each transform unit of said block responsive to said type of split; and
  inverse transforming decoded transform coefficients of said transform units using the determined transforms According to a general aspect of at least one embodiment, a decoding apparatus is presented that comprises one or more processors configured to perform:
  decoding a type of split of a block into transform units;
  determining a transform for each transform unit of said block responsive to said type of split; and
  inverse transforming decoded transform coefficients of said transform units using the determined transforms According to a general aspect of at least one embodiment, an encoding method is presented, comprising:
  determining and encoding a type of split of a block into transform units;
  determining a transform for each transform unit of said block responsive to said type of split;
  transforming residuals of said transform units using the determined transforms.

According to a general aspect of at least one embodiment, an encoding apparatus is presented, comprising one or more processors configured to perform:
  determining and encoding a type of split of a block into transform units;
  determining a transform for each transform unit of said block responsive to said type of split;
  transforming residuals of said transform units using the determined transforms.

According to another general aspect of at least one embodiment, a bitstream is formatted to include signal generated according to the encoding methods described above.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

4. BRIEF SUMMARY OF THE DRAWINGS

5. DETAILED DESCRIPTION

Figure 1:
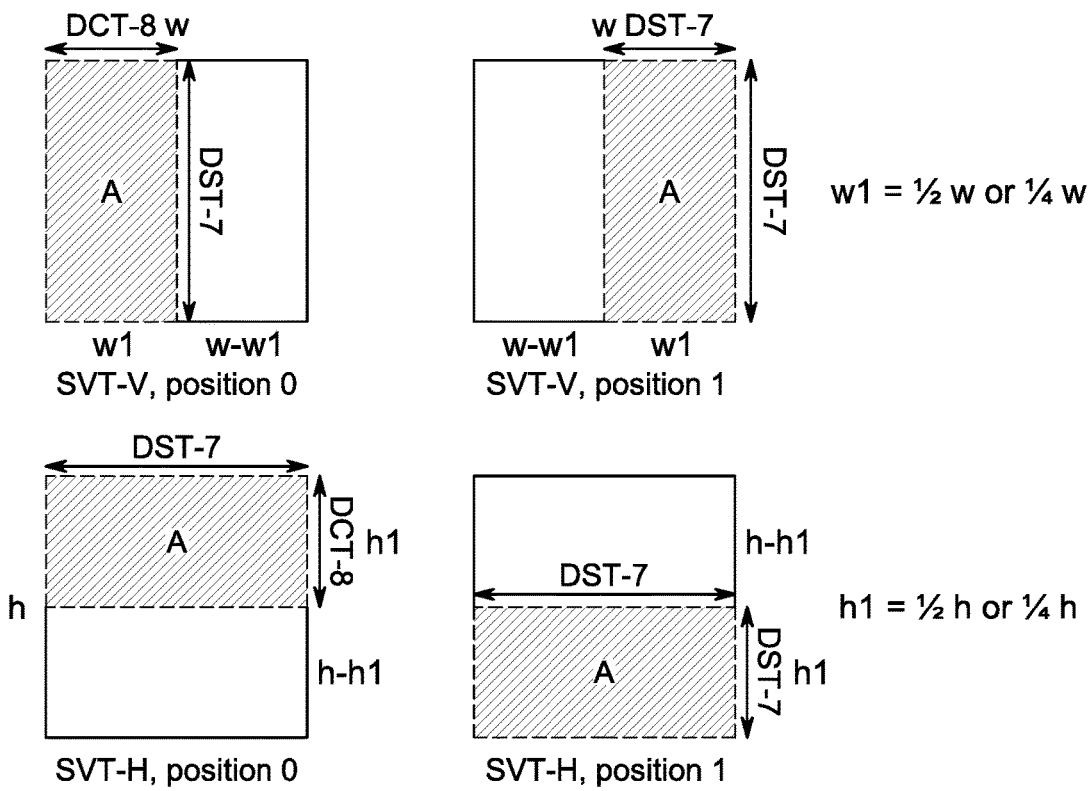
FIG. 1 depicts blocks split into Transform Units (TUs) either vertically (top of FIG. 1) or horizontally (bottom of FIG. 1)

In HEVC coding, a picture is partitioned into CTUs of square shape with a configurable size typically 64×64. The size may be 128×128, or 256×256 in other video coding standards. A CTU is the root of a quad-tree partitioning into 4 square Coding Units (CU) of equal size, i.e. half of the parent block size in width and in height. A quad-tree is a tree in which a parent node can be split into four child nodes, each of which may become parent node for another split into four child nodes. In HEVC, a coding Block (CB) is partitioned into one or more Prediction Blocks (PB) and forms the root of a quadtree partitioning into Transform Blocks (TBs). Corresponding to the Coding Block, Prediction Block and Transform Block, a Coding Unit (CU) includes the Prediction Units (PUs) and the tree-structured set of Transform Units (TUs), a PU includes the prediction information for all color components, and a TU includes residual coding syntax structure for each color component. The size of a CB, PB and TB of the luma component applies to the corresponding CU, PU and TU.

In more recent encoding systems, e.g. VVC (Versatile Video Coding), a CTU is the root of a coding tree partitioning into Coding Units (CU). A coding tree is a tree in which a parent node (usually corresponding to a block) can be split into child nodes (e.g. into 2, 3 or 4 child nodes), each of which may become parent node for another split into child nodes. In addition to the quad-tree split mode, new split modes (binary tree symmetric split modes, binary tree asymmetric split modes and triple tree split modes) are also defined that increase the total number of possible split modes. The coding tree has a unique root node, e.g. a CTU. A leaf of the coding tree is a terminating node of the tree. Each node of the coding tree represents a block that may be further split into smaller blocks also named sub-blocks. Once the partitioning of a CTU into CUs is determined, CUs corresponding to the leaves of the coding tree are encoded. The partitioning of a CTU into CUs and the coding parameters used for encoding each CU (corresponding to a leaf of the coding tree) may be determined on the encoder side through a rate distortion optimization procedure.

In the present application, the term "block" or "picture block" can be used to refer to any one of a CTU, a CU, a PU, a TU, a CB, a PB and a TB. In addition, the term "block" or "picture block" can be used to refer to a macroblock, a partition and a sub-block as specified in H.264/AVC or in other video coding standards, and more generally to refer to an array of samples of numerous sizes.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

In HEVC, the prediction unit is split to transform unit with a technique known as residual quad tree. This technique provides the coding system with a flexibility to better fit the residual signal properties when some discontinuities exist. Therefore, a significant bitrate gain can be achieved with this tool.

In VVC, DST7 and DCT8 are used in addition to the classical DCT2 transform. A whole CU/PU may thus be transformed by applying one of the transforms horizontally and one of the transforms vertically.

In a variant, a CU/PU may be first split into TUs which are then transformed. FIG. 1 thus depicts blocks (e.g. PUs) split into TUs either vertically (top of FIG. 1) or horizontally (bottom of FIG. 1). On this figure a block is split only in two TUs either vertically or horizontally and the selection of the horizontal and vertical transforms is predefined. It is thus limited in the way a block is split into TUs. In addition, there is only a single manner for selecting the transform type of the different TU. For example, in the case where the block is split vertically into two TUs. The first TU (on the left of the block) is transformed by applying a DCT-8 on the line of the first TU and a DST-7 on the columns while the second TU (on the right of the block) is transformed by applying a DST-7 on the line of the second TU and a DST-7 on the columns.

At least one embodiment enables splitting of a block (e.g. CU or PU) into a plurality of TUs according to various split types.

When a split occurs, the encoder has several options to select the transform type of each TU. This results in significant bit cost since the transform type has to be signaled for each TU. Therefore, at least one embodiment proposes to restrict the transform selection of TUs, namely in the case where several split types are allowed and various transforms in addition to the classical DCT2 are used.

In one embodiment, a transform is determined for a TU responsive to a transform determined for a spatially neighboring TU.

Figure 2:
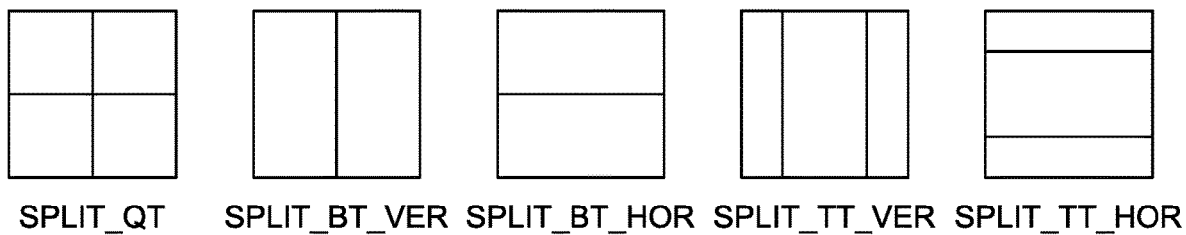
FIG. 2 illustrates the splitting of a block into TUs according to various quad-tree, binary tree and ternary tree split types.
Figure 3:
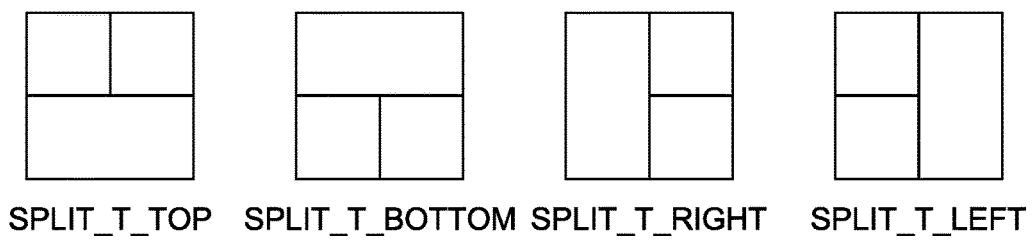
FIG. 3 illustrates the splitting of a block into TUs according to a T-type split.
Figure 4:
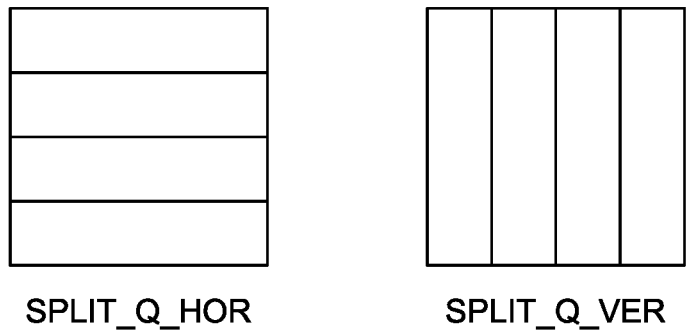
FIG. 4 illustrates the splitting of a block into four TUs vertically and horizontally.

FIGS. 2, 3 and 4 depicts various split types of a block into TUs. FIG. 2 illustrates the splitting of a block, e.g. a CU or a PU, into TUs according to a quadtree (SPLIT_QT), according to a binary tree vertical split (SPLIT_BT_VER), according to a binary tree horizontal split (SPLIT_BT_HOR), according to a triple tree vertical split (SPLIT_TT_VER) and according to a triple tree horizontal split (SPLIT_TT_VER). In the case of SPLIT_BT_VER and SPLIT_BT_HOR the block is split symmetrically into two TUs. In the case of SPLIT_TT_VER, the block of width W is split into three TUs of width equal to 0.25*W, 05*W and 0.25*W respectively. In the case of SPLIT_TT_HOR, the block of height H is split into three TUs of height equal to 0.25*H, 05*H and 0.25*H respectively.

FIG. 3 illustrates the splitting of a block, e.g. a CU or a PU, into TUs according to a T-type split. In the case of SPLIT_T_TOP, the block is first split horizontally into two sub-blocks of identical size, wherein the top sub-block is further split vertically into two TUs of identical size. The block is thus finally split into three TUs. In the same way, in the case of the SPLIT_T_BOTTOM, the block is first split horizontally into two sub-blocks of identical size, wherein the bottom sub-block is further split vertically into two TUs of identical size. In the case of SPLIT_T_RIGHT, the block is first split vertically into two sub-blocks of identical size, wherein the right sub-block is further split horizontally into two TUs of identical size. The block is thus finally split into three TUs. In the same way, in the case of SPLIT_T_LEFT, the block is first split vertically into two sub-blocks of identical size, wherein the left sub-block is further split horizontally into two TUs of identical size.

FIG. 4 illustrates the splitting of a block, e.g. a CU or a PU, into four TUs vertically (SPLIT_Q_VER) and horizontally (SPLIT_Q_HOR). In the case SPLIT_Q_VER, the block of width W is split into four TUs, each having a width equal to 0.25*W. In the case of SPLIT_QT_HOR, the block of height H is split into four TUs, each having a height equal to 0.25*H.

From a single block/PU/CU, multiple TUs can be obtained by splitting the block/PU/CU according to one of the split types of FIGS. 2, 3 and 4.

Figure 5:
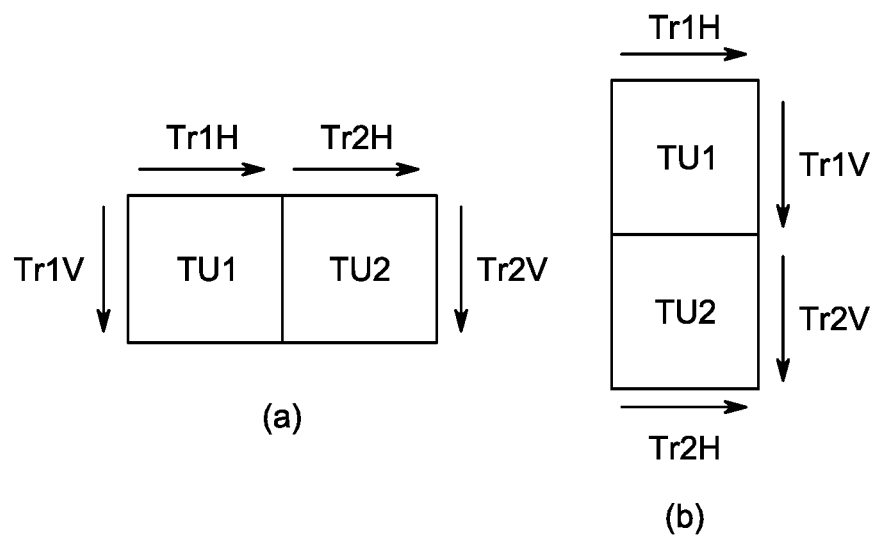
FIG. 5 depicts a block split into two TUs either vertically (FIG. 5(a)) and horizontally (FIG. 5(b))

FIG. 5 depicts a block split into two TUs either vertically (FIG. 5(a)) and horizontally (FIG. 5(b)). Whenever a split occurs, it is highly probable that there is some discontinuity around the split boundaries, i.e. an edge is probably present. On FIG. 5(a), a vertical split occurs. Therefore, it is probable that there is some discontinuity around the vertical split line, whereas the vertical characteristics of TU1 and TU2 can be assumed to be similar. Therefore, in one embodiment, Tr1V and Tr2V are selected so that they are similar transforms. In a variant, Tr2V and Tr1V are selected so that they are identical. On the other hand, Tr2H is selected to be a complementary transform of Tr1H.

On FIG. 5(*b*), a horizontal split occurs. Therefore, it is probable that there is some discontinuity around the split line, whereas the horizontal characteristics of TU1 and TU2 can be assumed to be similar.

Therefore, in one embodiment, Tr1H and Tr2HV are selected so that they are similar transforms. In a variant, Tr1H and Tr2H are selected so that they are identical. On the other hand, Tr2V is selected to be a complementary transform of Tr1V.

More generally, in one embodiment the transforms applied along the splitting lines are selected so that they are similar or even identical while the transforms applied perpendicular to the splitting line(s) are selected so that they are complementary.

Figure 6:
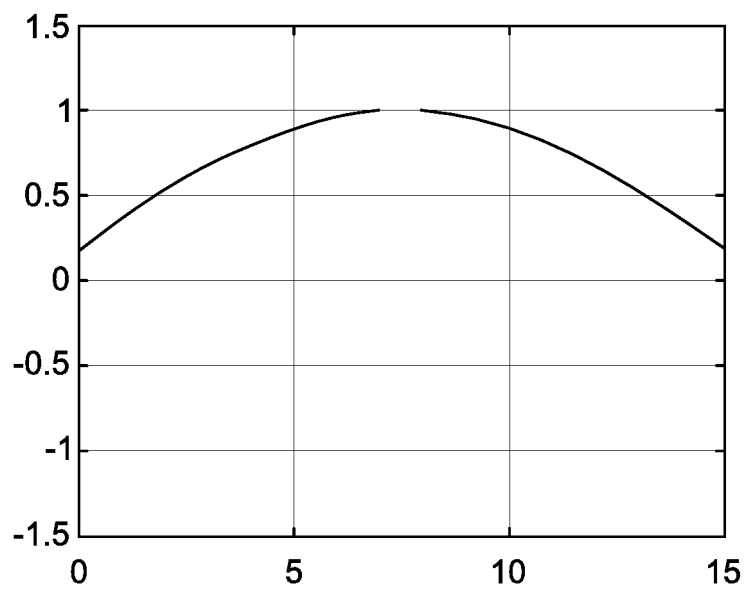
FIGS. 6, 7 and 8 illustrate different cases of complementary transforms.
Figure 6:
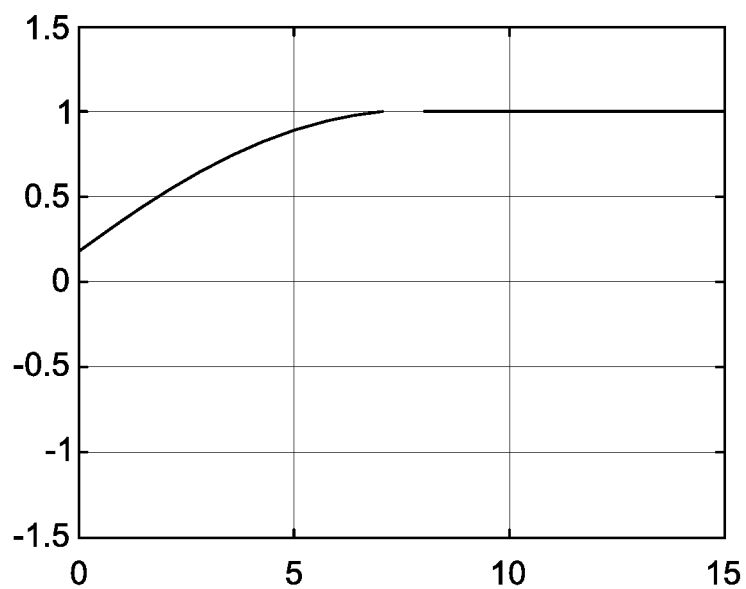
Figure 7:
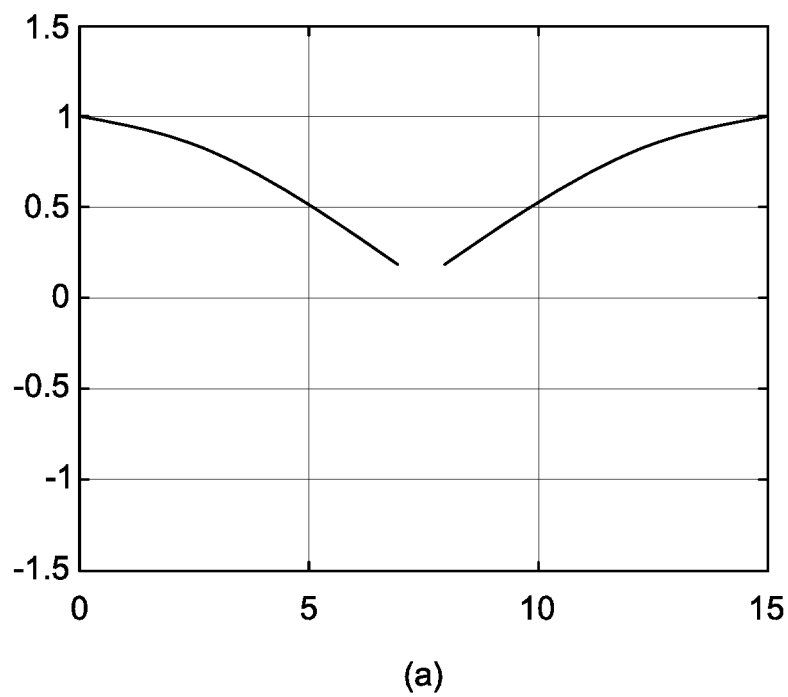
Figure 7:
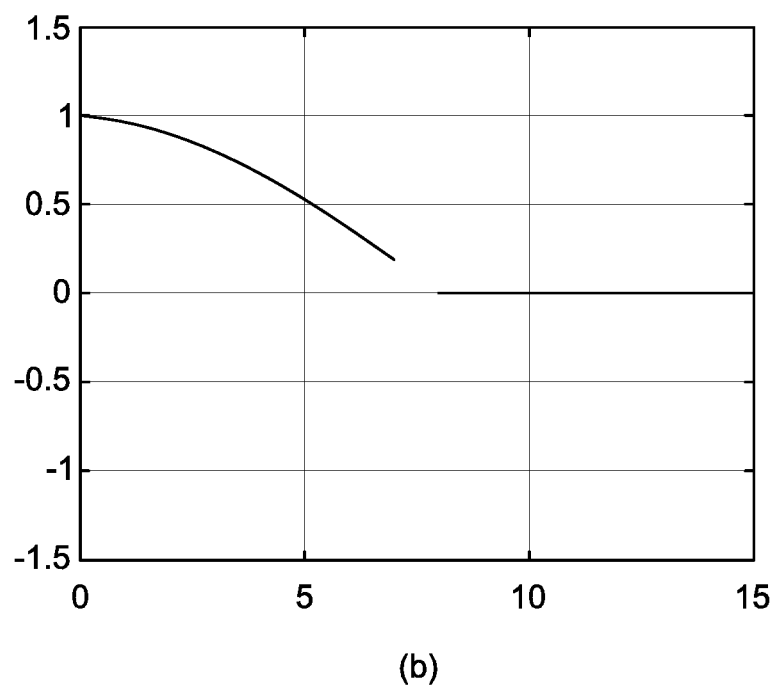
Figure 8:
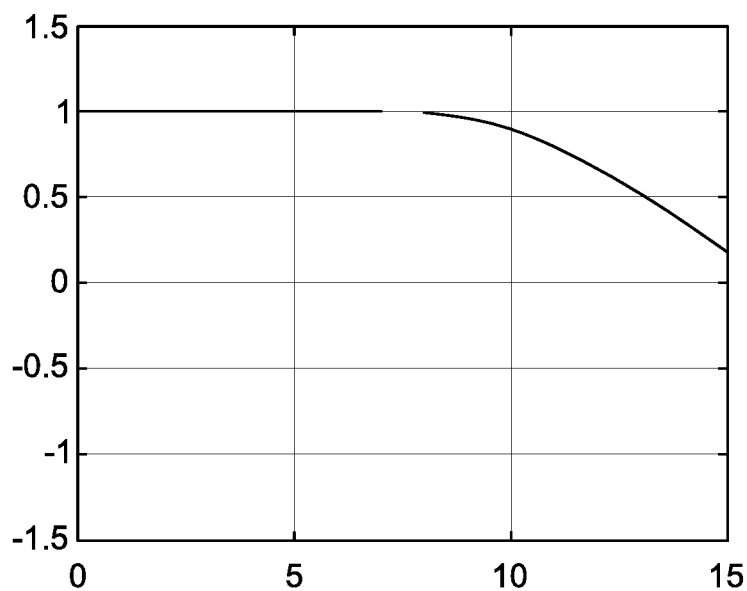
Figure 8:
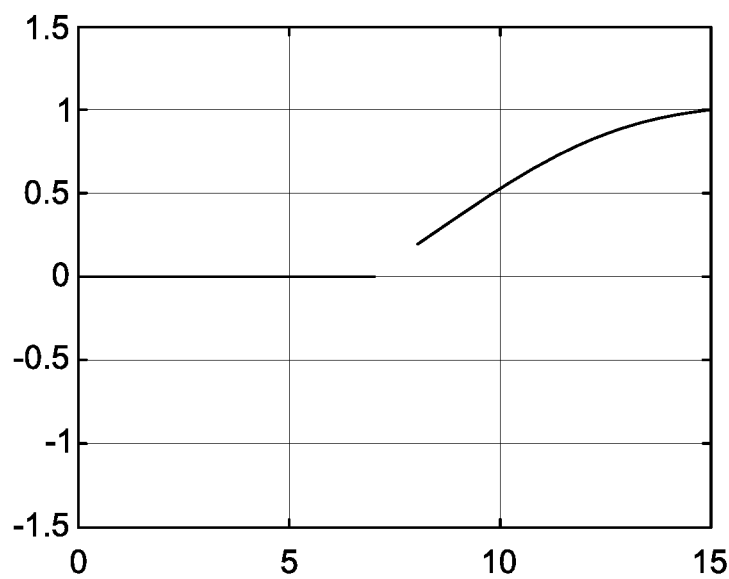

A complementary transform of an original transform is a transform whose first basis function well matches first basis function of the original transform, i.e. is in the continuation of the first basis function of the original transform as depicted on FIGS. 6-8. Indeed, the first basis function is the most important one for representing the transform. It represents basis function of the considered transform at the lowest frequency. Complementary functions are defined in Table 1.

TABLE 1

| Transform | Complementary transform |
| --- | --- |
| Increasing first basis function (e.g. DST7) | Decreasing first basis function (e.g. DCT8) or constant first basis function |
| Decreasing first basis function | Increasing first basis function or zero first basis function |
| Constant first basis function | Decreasing first basis function |
| Zero first basis function | Increasing first basis function |

A zero transform is a transform whose basis functions are zero. In other words, a zero transform transforms residues into coefficients equal to zero.

Some of the DCT/DST transform family can be classified as increasing, decreasing and constant first basis function as in Table 2.

TABLE 2

| Transform | First basis Type |
| --- | --- |
| DCT1 | Constant |
| DCT2 | Constant |
| DCT3 | Decreasing |
| DCT4 | Decreasing |
| DCT5 | Constant |
| DCT6 | Constant |
| DCT7 | Decreasing |
| DCT8 | Decreasing |
| DST1 | Constant |
| DST2 | Constant |
| DST3 | Increasing |
| DST4 | Increasing |
| DST7 | Increasing |
| DST8 | Increasing |

As an example, DCT2 basis functions $T_i(j)$, i, j=0, 1, . . . , N−1 are defined as follows:

$$T_i(j) = \omega_0 \cdot \sqrt{\frac{2}{N}} \cdot \cos\left(\frac{\pi \cdot i \cdot (2j+1)}{2N}\right), \text{ where } \omega_0 = \begin{cases} \sqrt{\frac{2}{N}} & i = 0 \\ 1 & i \neq 0 \end{cases}$$

The first basis function is for i=0 and is thus constant for DCT2.

As another example, DCT8 basis functions $T_i(j)$, i, j=0, 1, . . . , N−1 are defined as follows:

$$T_i(j) = \sqrt{\frac{4}{2N+1}} \cdot \cos\left(\frac{\pi \cdot (2i+1) \cdot (2j+1)}{4N+2}\right)$$

The first basis function is for i=0 and is thus decreasing for DCT8.

As another example, DST7 basis functions $T_i(j)$, i, j=0, 1, . . . , N−1 are defined as follows:

$$T_i(j) = \sqrt{\frac{4}{2N+1}} \cdot \sin\left(\frac{\pi \cdot (2i+1) \cdot (j+1)}{2N+1}\right)$$

The first basis function is for i=0 and is thus increasing for DST7.

FIGS. 6, 7 and 8 illustrates the different cases for complementary transforms (according to table 1). On each graphic, the first basis function of a transform is plotted (on the left) followed by the first basis function of the complementary transform (on the right). On FIG. 6, the first basis function of the DCT8 transform (increasing basis function) is plotted followed by the first basis function of the complementary transform, which is the DST7 (decreasing basis function) on FIG. 6*a* and which is the DCT2 (constant basis function) on FIG. 6*b*.

On FIG. 7, the first basis function of the DST7 transform (decreasing basis function) is plotted followed by the first basis function of the complementary transform, which is the DCT8 (increasing basis function) on FIG. 7*a* and which is the zero basis function on FIG. 7*b*.

On FIG. 8(*a*), the first basis function of the DCT2 transform (constant basis function) is plotted followed by the first basis function of the complementary transform, which is the DST7 (decreasing basis function). On FIG. 8(*b*), zero basis is plotted followed by the first basis function of the complementary transform, which is the DCT8 (increasing basis function).

Referring back to FIG. 5, in a first embodiment, the transforms applied along, i.e. parallel to, the splitting lines are selected so that they are identical. Therefore, the signaling cost is decreased since only one transform (Tr1V; Tr1H respectively) needs to be signaled instead of two (Tr1V and Tr2V; Tr1H and Tr2H respectively).

Figure 9:
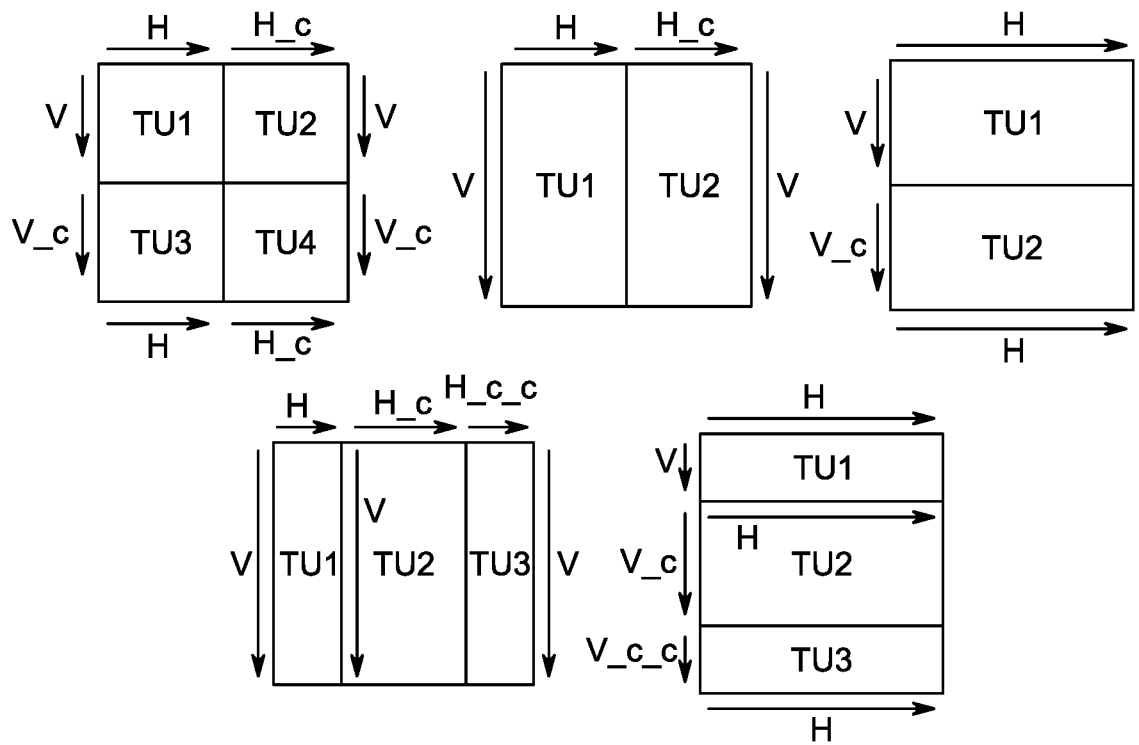
FIGS. 9, 10 and 11 illustrate the determination of transforms for various split types.
Figure 10:
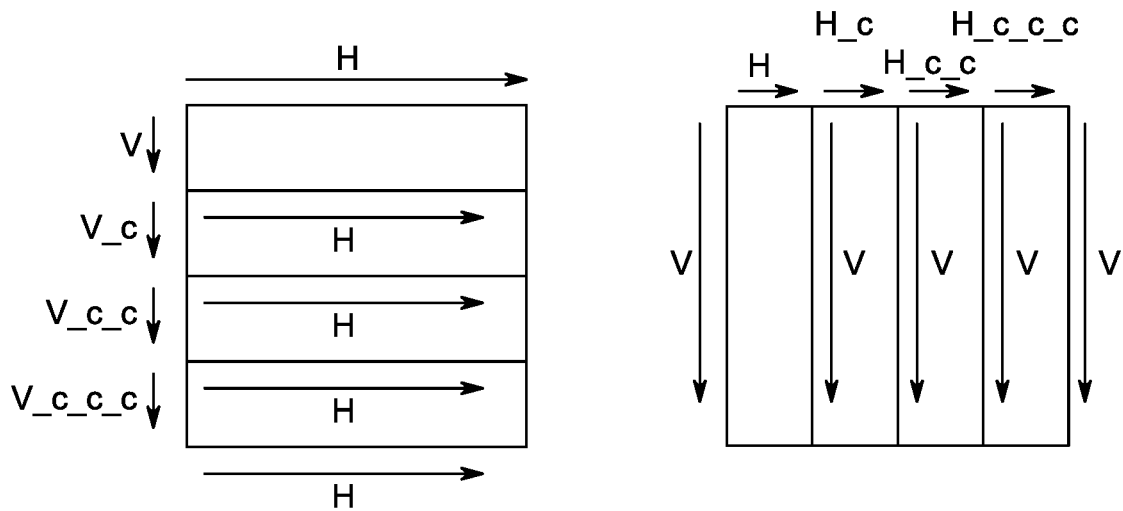
Figure 11:
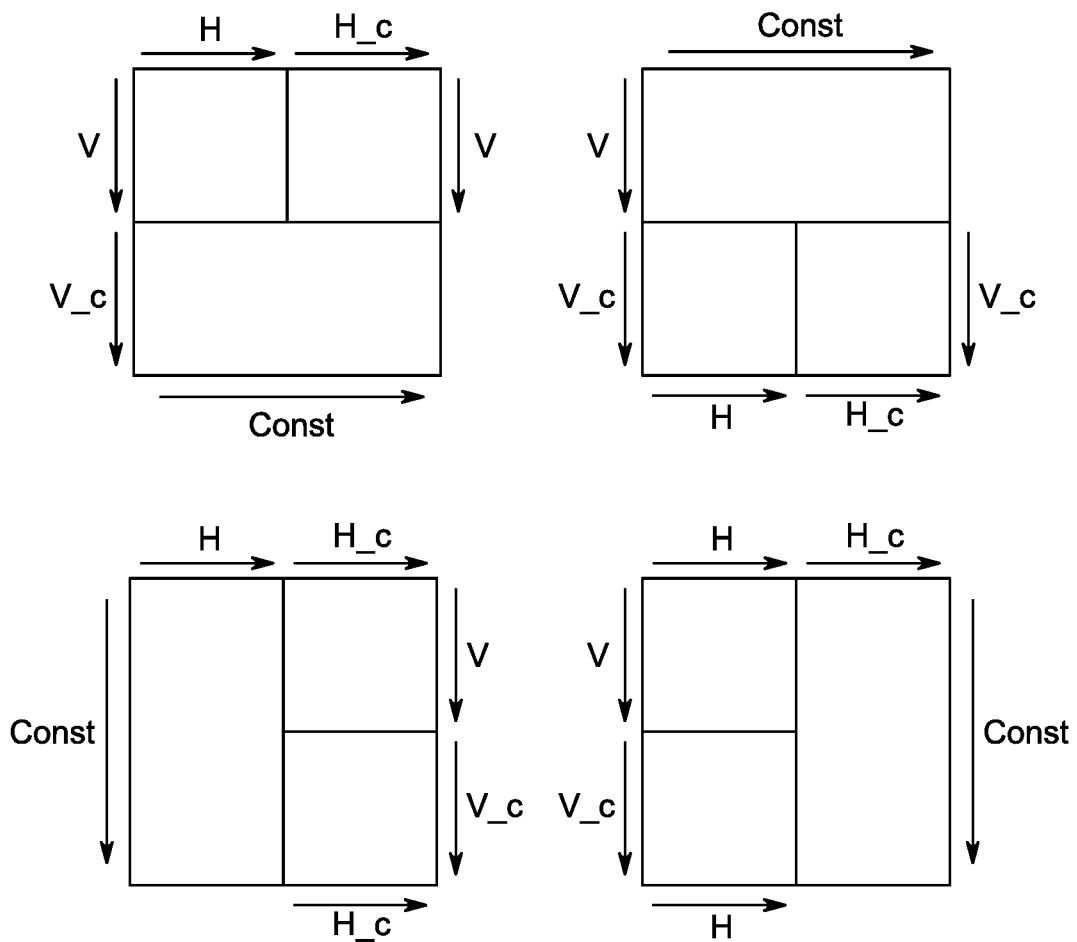

FIGS. 9, 10 and 11 illustrates this first embodiment for the various split types depicted on FIGS. 2-4, wherein the transforms applied along, i.e. parallel to the splitting lines, are identical. As an example, on FIG. 9, for the split type SPLIT_BT_VER, the same transform denoted V is applied parallel to the vertical split line. The same principle applies for the split type SPLIT_BT_HOR, where the same transform denoted H is applied parallel to the horizontal split line.

Referring back to FIG. 5, in a second embodiment, the transforms applied perpendicular to a splitting line are selected so that they are complementary. Therefore, the signaling cost is decreased since only one transform (Tr1H; Tr1V respectively) needs to be signaled instead of two (Tr1H and Tr2H; Tr1V and Tr2V respectively).

FIGS. 9, 10 and 11 also illustrates this second embodiment for the various split types depicted on FIGS. 2-4, wherein the transforms applied perpendicular to the splitting lines, are complementary. As an example, on FIG. 9, for the split type SPLIT_BT_VER, complementary transforms denoted H and H_c are applied perpendicular to the vertical split line. The same principle applies for the split type SPLIT_BT_HOR, where complementary transforms denoted V and V_c are applied perpendicular to the horizontal split line.

For the split type SPLIT_TT_VER, complementary transforms denoted H and H_c are applied perpendicular to the first vertical split line on the first two blocks (TU1 and TU2) and complementary transforms denoted H_c and H_c_c are applied perpendicular to the second vertical split line on the last two blocks (TU2 and TU3). The same principle applies for the split type SPLIT_TT_VER, where complementary transforms denoted V and V_c (TU1 and TU2) are applied perpendicular to the first horizontal split line on the first two blocks and complementary transforms denoted V_c and V_c_c (TU2 and TU3) are applied perpendicular to the second vertical split line on the last two blocks. In the case of TT split, there are 3 horizontal (vertical) TUs. The first horizontal (vertical) TU1 is considered as the reference to the second one TU2, and the second one TU2 is considered as the reference to the third one TU3.

On FIG. 10, for the split type SPLIT_Q_HOR complementary transforms are applied perpendicular to the vertical split line. More particularly, V and its complementary transform V_c are applied on the first two blocks, next V_c_c is applied that is the complementary transform V_c applied on the neighboring block just above, next V_c_c_c is applied that is the complementary transform V_c_c applied on the neighboring block just above. The same principle applies for the split type SPLIT_Q_VER. H_c is the complementary transform of H, H_c_c is the complementary transform of H_c and H_c_c_c is the complementary transform of H_c_c. On FIG. 11, a specific transform Const is applied on the larger TU in a direction parallel to the larger split direction. Const is a transform whose first basis function is constant (e.g. DCT2).

The first and second embodiments may be used independently or may be combined.

Figure 12:
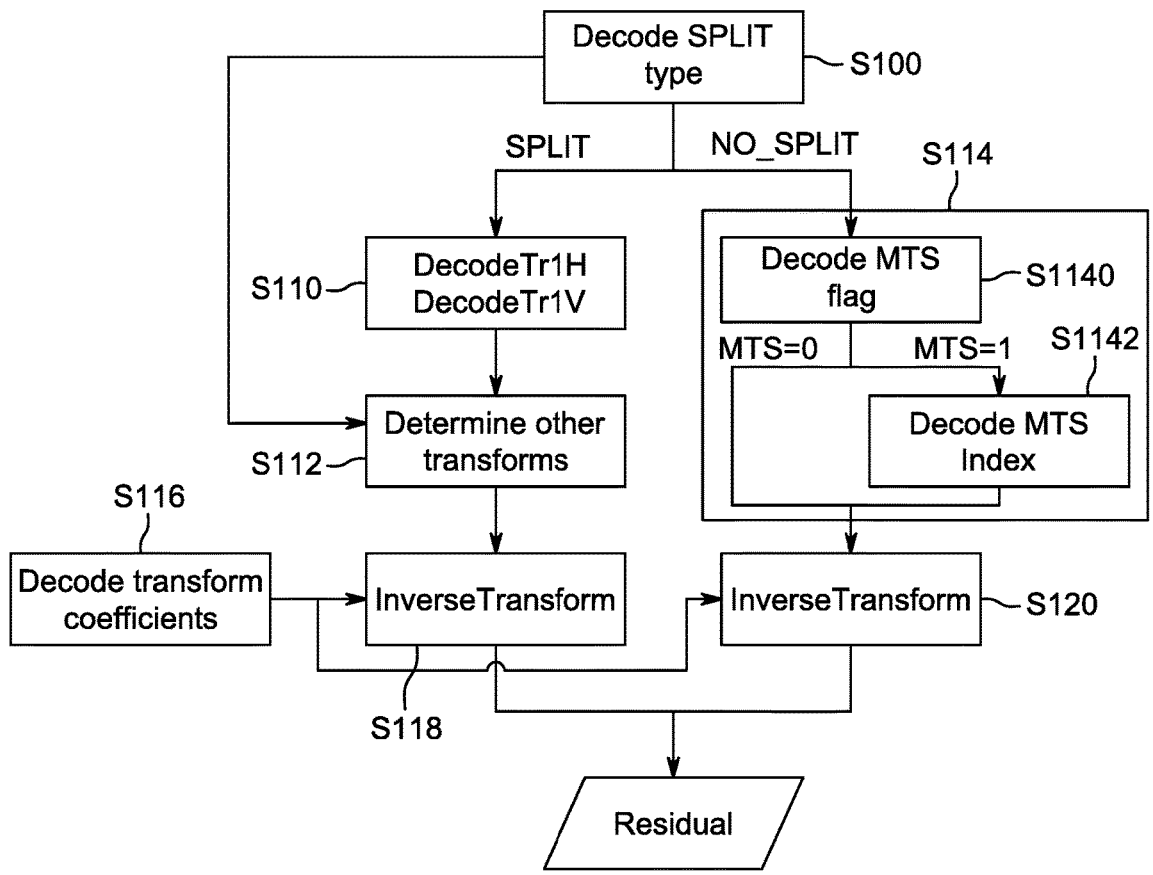
FIG. 12-14 are flowcharts of a decoding method according to various embodiments.

FIG. 12 is a flowchart of a decoding method according to one embodiment. At S100, a split type is decoded. In the case where the block is split, a first horizontal transform Tr1H and a vertical transform Tr1V are decoded, more precisely indices identifying these transforms are decoded (S110). The other transforms used in the block are further derived from at least one of these two transforms (S112). As an example, in S112, the transforms applied parallel to the splitting lines are determined so that they are identical to Tr1H in the case where the splitting line is horizontal). As an example, in S112, the transforms applied parallel to the splitting lines are determined so that they are identical to Tr1V in the case where the splitting line is vertical. As an example, in S112, in the case of FIG. 5(a), Tr2V is determined to be identical to decoded Tr1V. In this embodiment, the other transform Tr2H may also be decoded at S110.

In a variant, the other transforms used in the block are further derived from these two transforms. In this variant, the transforms applied perpendicular to a split line are determined to be complementary. As an example, in S112, in the case of FIG. 5(a), Tr2V is determined to be identical to decoded Tr1V and Tr2H is chosen to be complementary to decoded Tr1H. Therefore, the transforms Tr2H and Tr2V (which are not decoded) are determined from the transforms decoded at S110.

In the case where a transform has more than one complementary transform, an additional bit is decoded to indicate which complementary transform is used. As an example, in the case where the first basis function of the decoded transform Tr1H is decreasing (e.g. Tr1H=DCT8), it may have two complementary transforms as indicated in Table 1: one having an increasing first basis function and the other having a zero first basis function. A binary of value 0 can designate the first complementary transform (increasing first basis function, e.g. DST7) and a value of 1 can designate the zero first basis function complementary transform.

In the case where the decoded transform first basis function is zero or constant, there is a single complementary transform as indicated in Table 1, no additional binary value is decoded in this case.

For QT and T split types, up to 2 additional binary values are decoded to indicate the complementary horizontal (H_c) and vertical transforms (V_c). For BT, up to 1 additional binary value is decoded to indicate either the complementary horizontal or vertical transform (V_c for SPLIT_BT_HOR and H_c for SPLIT_BT_VER respectively). For TT split types, up 2 additional binary values are decoded to indicate the first and second complementary transforms (H_c and H_c_c for SPLIT_TT_VER and V_c and V_c_c for SPLIT_TT_HOR) and for Quarter split types up to 3 additional binary values are decoded (H_c, H_c_c and H_c_c_c for SPLIT_Q_VER and V_c, V_c_c and V_c_c_c for SPLIT_Q_HOR).

Back to FIG. 12, in the case where the block is not split, a single transform is decoded for the whole block (S114). More particularly, at least one index (MTS flag) is decoded (S114) to identify the used transform. In a specific and non-limiting embodiment, S114 comprises decoding a MTS flag (S1140). In the case where MTS=0, then DCT2 is used. In the case where MTS=1, either DCT8 or DST7 is used depending on another decoded index (S1142). Other variants of S114 may be used. For example, a single flag may be decoded to directly indicate the used transform for the whole block.

Once the transforms to be used are determined, transform coefficients decoded at S116 are inverse transformed using the determined transformed (S118, S120) to obtain the residuals.

In a variant, the number of complementary transforms is limited to one. In this case no additional binary value is decoded in S112 since once a transform is known, its complementary transform is also known as indicated in table 3 below.

TABLE 3

| Transform | Complementary transform |
| --- | --- |
| Increasing first basis function (e.g. DST7) | Decreasing first basis function (e.g. DCT8) |
| Decreasing first basis function | Increasing first basis function |
| Constant first basis function | Decreasing first basis function |
| Zero first basis function | Increasing first basis function |

As an example, in the case where the first basis function of the decoded transform Tr1H is decreasing (e.g.

Tr1H=DCT8), it has a single complementary transform as indicated in table 2, namely one having an increasing first basis function. This embodiment improves coding efficiency since no additional is decoded. Reverse is a special case of complementary transform. The reverse transform is the transform whose first basis function has a reverse property (increasing versus decreasing) to the original transform. Namely, a transform whose first basis function is increasing (e.g. DST7), its reverse transform's first basis function is a decreasing one (e.g. DCT8).

In a variant, the two last lines of Table 3 are removed.

Figure 13:
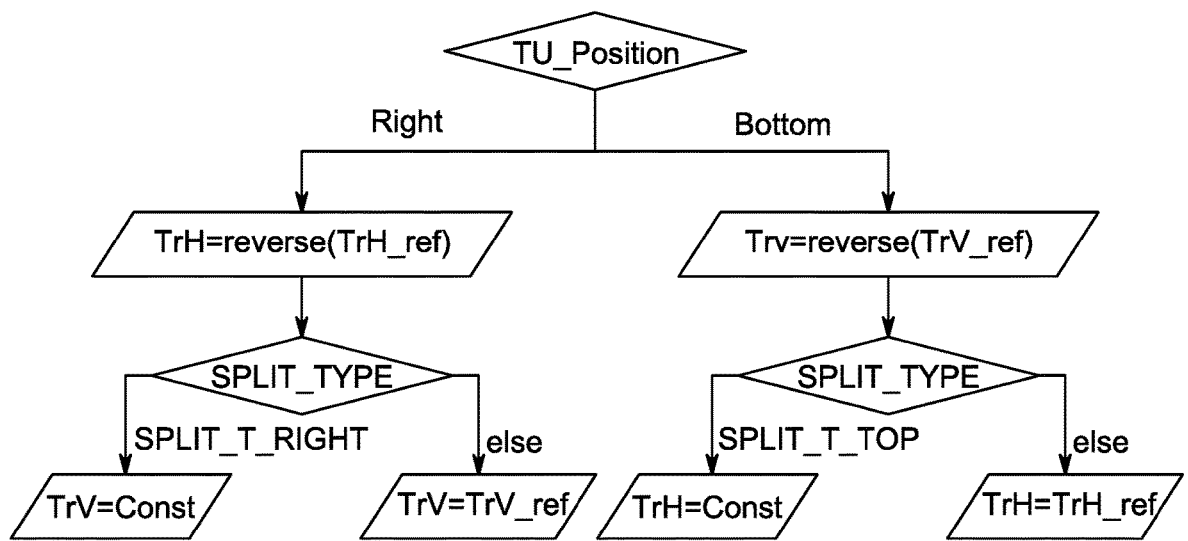

On FIG. 13, the first TU of the block is considered as the reference TU whose horizontal and vertical transforms (Tr1H and Tr1V) are decoded. The right, bottom and bottom-right TUs can be obtained by either reusing the same transform, its reverse or a constant transform for T-type split (as illustrated by FIG. 11).

Figure 14:
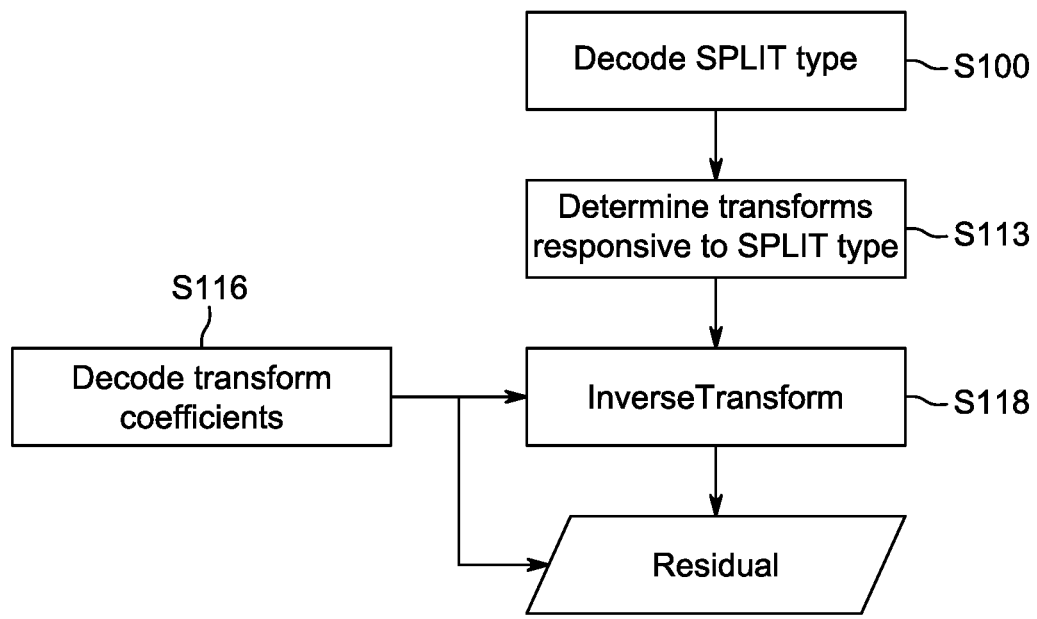

FIG. 14 is a flowchart of a decoding method according to another embodiment. The steps identical to the steps of FIG. 12 are identified with the same numerical references and are not further disclosed. In this embodiment, all the signaling of TUs transforms types are removed, including for the first TU. Therefore, S110 of FIG. 12 is removed. In S113, the transforms are directly determined responsive to the decoded SPLIT type.

To do so, the initial transforms are defined for each split type. Then, the mapping to other transforms is the same as illustrated on FIGS. 9-11. A set of transforms is selected that resembles well the type of split. In other words, the 2D first basis function of all TUs shows a similarity with the required split as illustrated by FIGS. 15-33.

Figure 15:
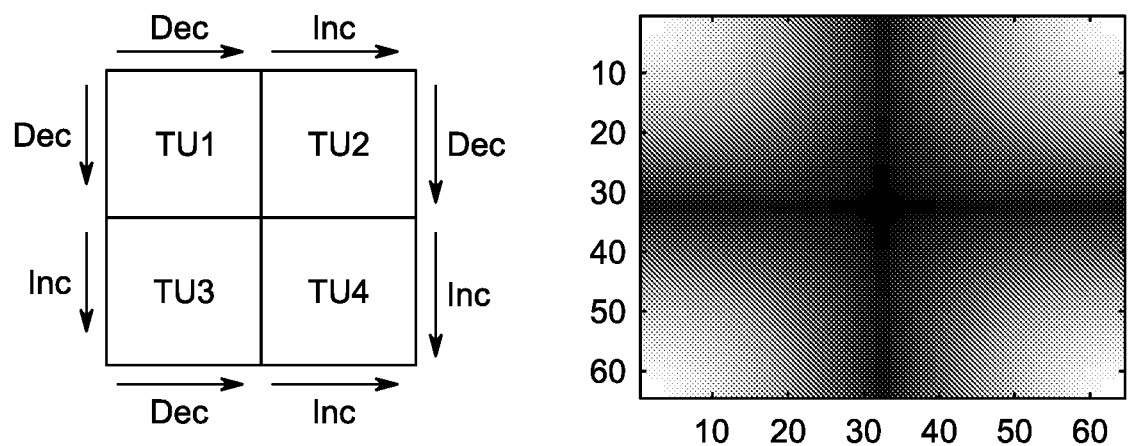
FIGS. 15-17, 19-20, 23-28 and 30-33 illustrates, on the left, the transform selection and shows, on the right, the 2D first basis function of all TUs for various split types.

FIG. 15 illustrates, on the left, the transform selection and shows, on the right, the 2D first basis function of all TUs in the case where split type is SPLIT_QT.

TU1 horizontal transform is of decreasing (Dec) first basis function (e.g. DCT8), and TU1 vertical transform is of decreasing first basis function (e.g. DCT8).

The other transforms are determined following the rules defined above.

TU2 horizontal transform is of increasing (Inc) first basis function (e.g. DST7), and TU2 vertical transform is of decreasing first basis function (e.g. DCT8).

TU3 horizontal transform is of decreasing first basis function (e.g. DCT8), and TU2 vertical transform is of increasing first basis function (e.g. DST7).

TU4 horizontal transform is of increasing first basis function (e.g. DST7), and TU2 vertical transform is of increasing first basis function (e.g. DST7).

The left of FIG. 15 illustrates the transform selection and the right of FIG. 15 shows the 2D first basis function of all TUs.

Figure 16:
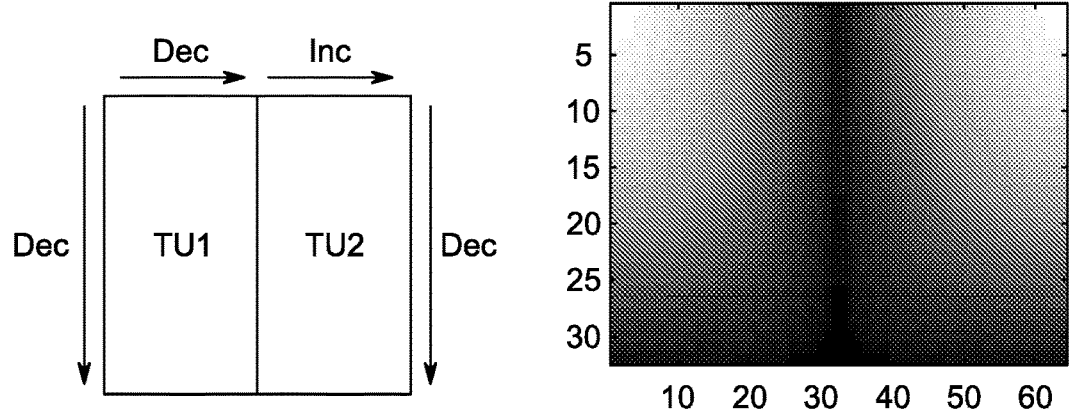

FIG. 16 illustrates, on the left, the transform selection and shows, on the right, the 2D first basis function of all TUs in the case where split type is SPLIT_BT_VER.

TU1 horizontal transform is of decreasing first basis function (e.g. DCT8), and TU1 vertical transform is of decreasing first basis function (e.g. DCT8).

TU2 horizontal transform is of increasing first basis function (e.g. DST7), and TU2 vertical transform is of decreasing first basis function (e.g. DCT8).

Figure 17:
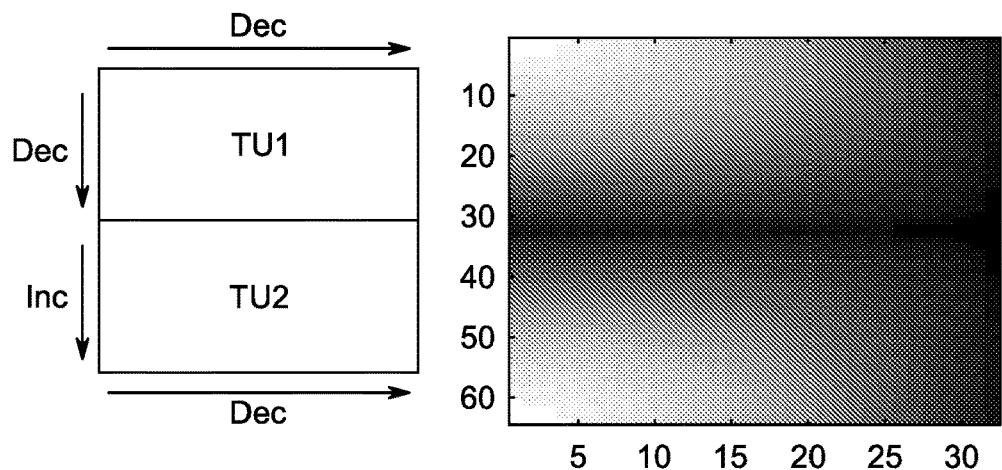

FIG. 17 illustrates, on the left, the transform selection and shows, on the right, the 2D first basis function of all TUs in the case where split type is SPLIT_BT_HOR.

TU1 vertical transform is of decreasing first basis function (e.g. DCT8), and TU1 horizontal transform is of decreasing first basis function (e.g. DCT8).

TU2 vertical transform is of increasing first basis function (e.g. DST7), and TU2 horizontal transform is of decreasing first basis function (e.g. DCT8).

Figure 18:
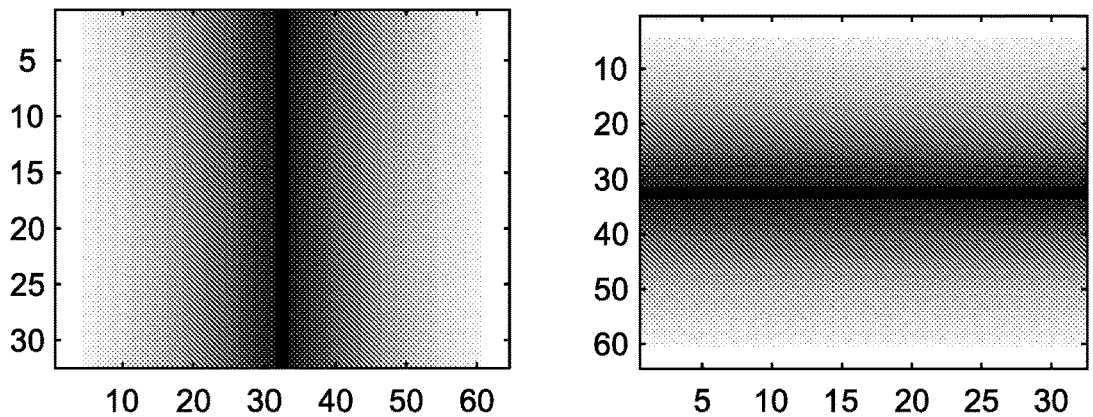
FIGS. 18, 21-22 and 29 shows 2D first basis function of all TUs for various split types.

Alternatively, for vertical split, the first vertical transform can be of constant first basis function or for horizontal split the first horizontal transform can be of constant first basis function. This is to achieve a sharper edge and more concentrated towards the center as shown in FIG. 18.

Figure 19:
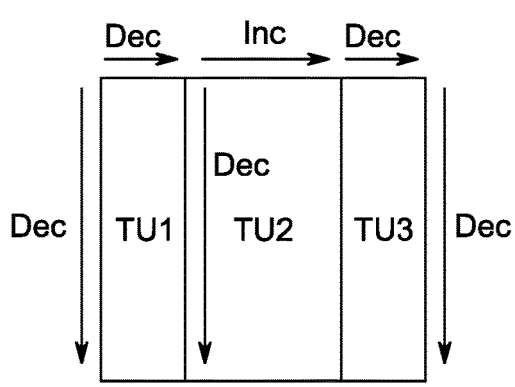
Figure 19:
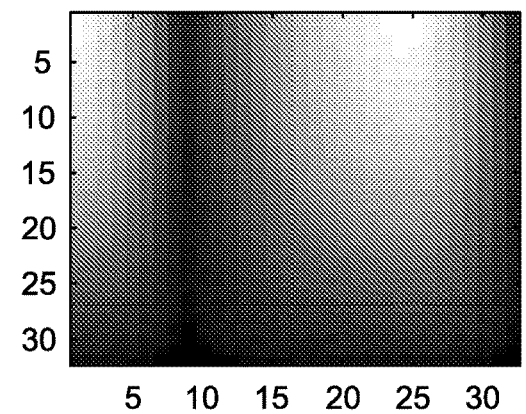

FIG. 19 illustrates, on the left, the transform selection and shows, on the right, the 2D first basis function of all TUs in the case where split type is SPLIT_TT_VER.

TU1 horizontal transform is of decreasing first basis function (e.g. DCT8), and TU1 vertical transform is of decreasing first basis function (e.g. DCT8).

TU2 horizontal transform is of increasing first basis function (e.g. DST7), and TU2 vertical transform is of decreasing first basis function (e.g. DCT8).

TU3 horizontal transform is of decreasing first basis function (e.g. DCT8), and TU2 vertical transform is of decreasing first basis function (e.g. DCT8).

Figure 20:
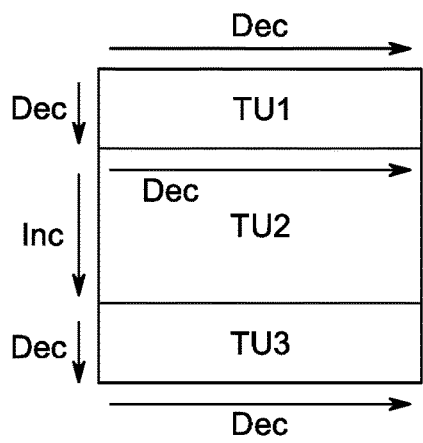
Figure 20:
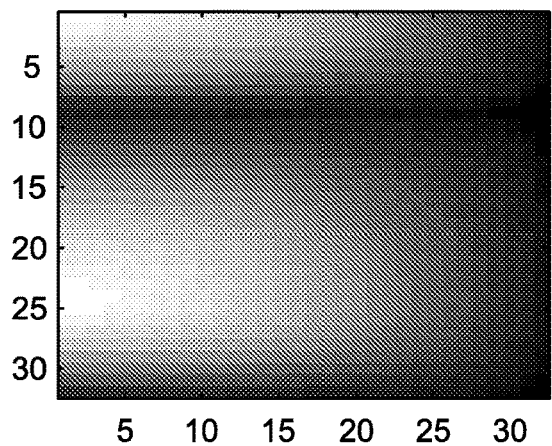

FIG. 20 illustrates, on the left, the transform selection and shows, on the right, the 2D first basis function of all TUs in the case where split type is SPLIT_TT_HOR.

TU1 vertical transform is of decreasing first basis function (e.g. DCT8), and TU1 horizontal transform is of decreasing first basis function (e.g. DCT8).

TU2 vertical transform is of increasing first basis function (e.g. DST7), and TU2 horizontal transform is of decreasing first basis function (e.g. DCT8).

TU3 vertical transform is of decreasing first basis function (e.g. DCT8), and TU2 horizontal transform is of decreasing first basis function (e.g. DCT8).

Figure 21:
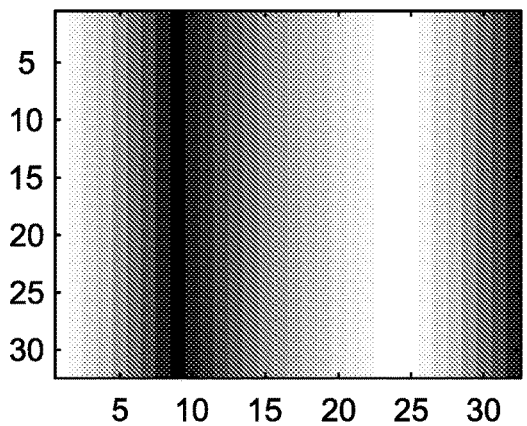
Figure 21:
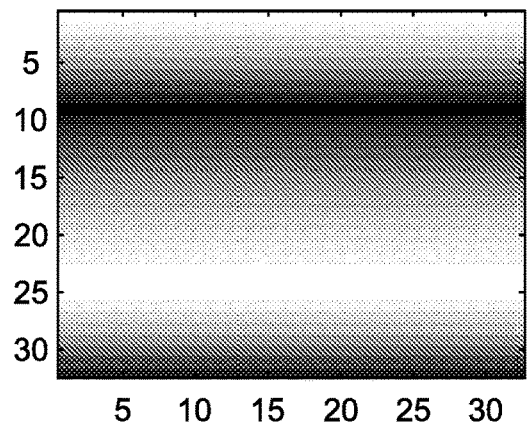

Alternatively, for vertical split, the first vertical transform can be of constant first basis function or for horizontal split the first horizontal transform can be of constant first basis function. This is to achieve a sharper edge and more concentrated towards the center as shown in FIG. 21.

To obtain a symmetry across the two boundaries of TT split, the central transform can be considered as a constant transform. Namely, for vertical TT, the following transforms can be used:

TU1 horizontal transform is of increasing first basis function (e.g. DST7), and TU1 vertical transform is of constant first basis function (e.g. DCT2).

TU2 horizontal transform is of constant first basis function (e.g. DCT2), and TU2 vertical transform is of constant first basis function (e.g. DCT2).

TU3 horizontal transform is of decreasing first basis function (e.g. DCT8), and TU3 vertical transform is of constant first basis function (e.g. DCT2).

For horizontal TT, the following transforms can be:

TU1 vertical transform is of increasing first basis function (e.g. DST7), and TU1 horizontal transform is of constant first basis function (e.g. DCT2).

TU2 vertical transform is of constant first basis function (e.g. DCT2), and TU2 horizontal transform is of constant first basis function (e.g. DCT2).

TU3 vertical transform is of decreasing first basis function (e.g. DCT8), and TU3 horizontal transform is of constant first basis function (e.g. DCT2).

Figure 22:
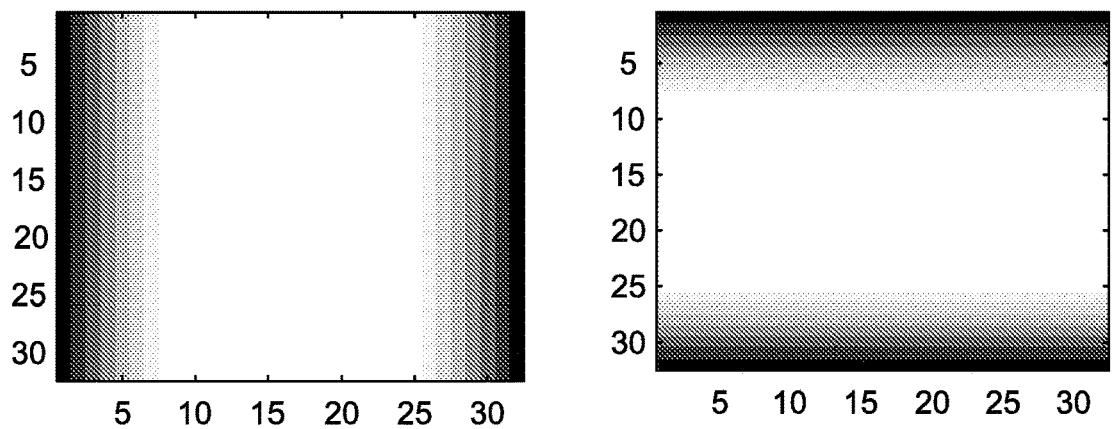

This results in basis functions shown the FIG. 22. Clearly, this is a better match for TT split.

Some TT cases can resemble very well the Asymmetric binary Tree (ABT), which split a block into 2 parts: ¼ and ¾.

Figure 23:
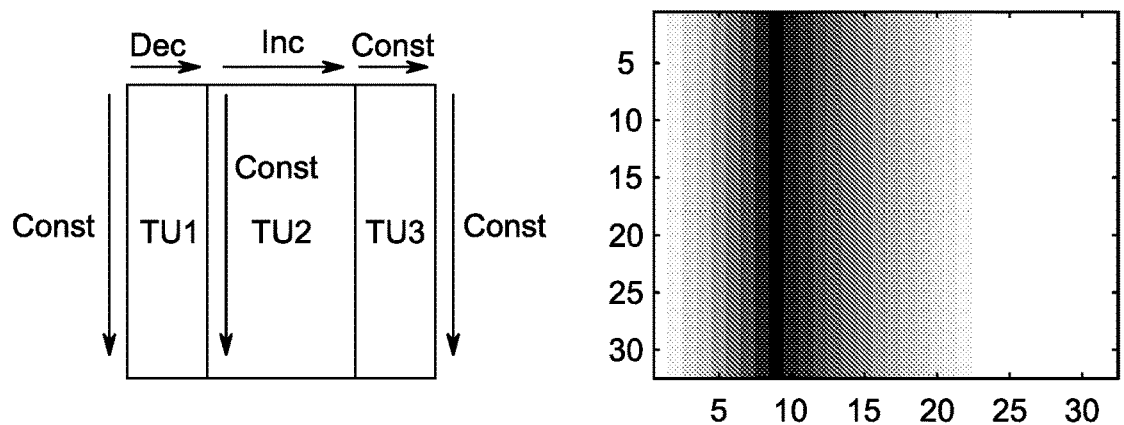

FIG. 23 illustrates, on the left, the transform selection and shows, on the right, the 2D first basis function of all TUs in the case where split type is SPLIT_TT_VER. The vertical ABT with left edge (ABT_VER_LEFT) can be achieved by using the following transforms:

TU1 horizontal transform is of decreasing first basis function (e.g. DCT8), and TU1 vertical transform is of constant first basis function (e.g. DCT2).

TU2 horizontal transform is of increasing first basis function (e.g. DST7), and TU2 vertical transform is of constant first basis function (e.g. DCT2).

TU3 horizontal transform is of constant first basis function (e.g. DCT2), and TU3 vertical transform is of constant first basis function (e.g. DCT2).

Figure 24:
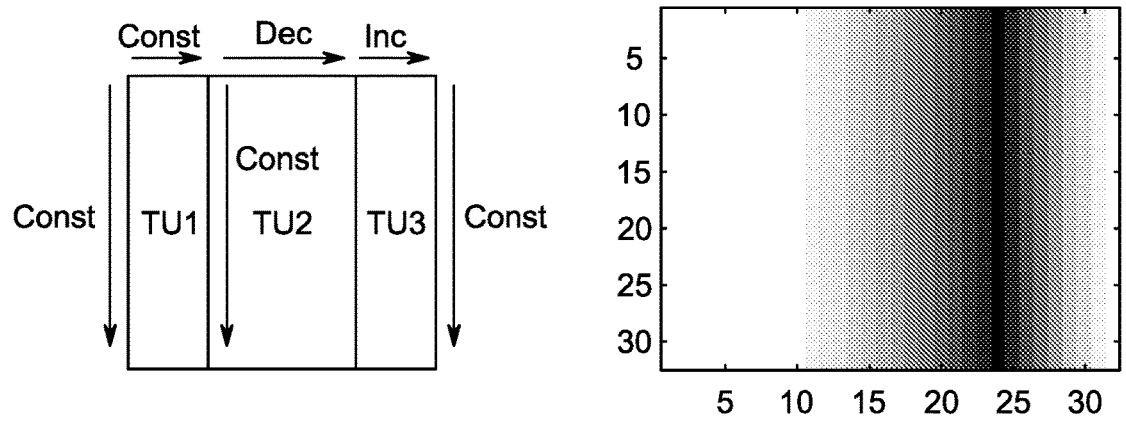

FIG. 24 illustrates, on the left, the transform selection and shows, on the right, the 2D first basis function of all TUs in the case where split type is SPLIT_TT_VER. The vertical ABT with left edge (ABT_VER_RIGHT) can be achieved by using the following transforms:

TU1 horizontal transform is of constant first basis function (e.g. DCT2), and TU1 vertical transform is of constant first basis function (e.g. DCT2).

TU2 horizontal transform is of decreasing first basis function (e.g. DCT8), and TU2 vertical transform is of constant first basis function (e.g. DCT2).

TU3 horizontal transform is of increasing first basis function (e.g. DST7), and TU3 vertical transform is of constant first basis function (e.g. DCT2).

Figure 25:
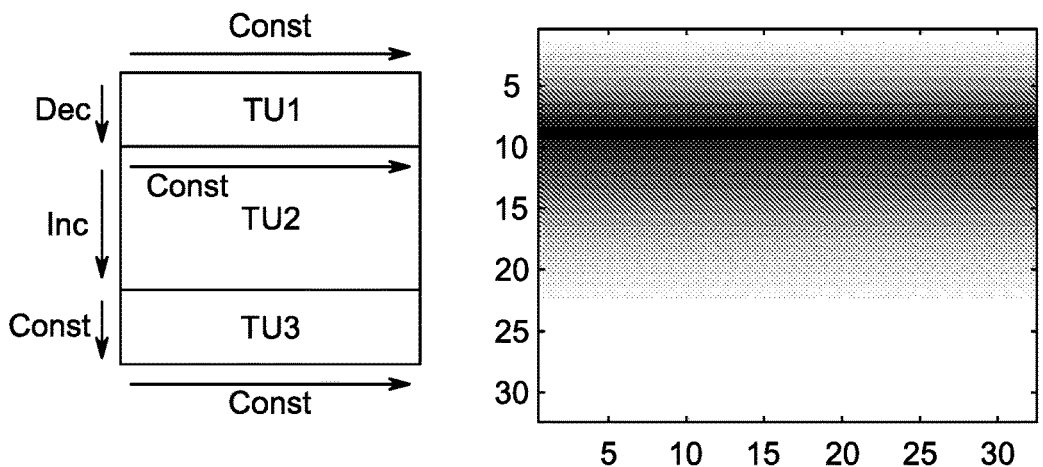

FIG. 25 illustrates, on the left, the transform selection and shows, on the right, the 2D first basis function of all TUs in the case where split type is SPLIT_TT_HOR. The vertical ABT with left edge (ABT_HOR_TOP) can be achieved by using the following transforms:

TU1 vertical transform is of decreasing first basis function (e.g. DCT8), and TU1 horizontal transform is of constant first basis function (e.g. DCT2).

TU2 vertical transform is of increasing first basis function (e.g. DST7), and TU2 horizontal transform is of constant first basis function (e.g. DCT2).

TU3 vertical transform is of constant first basis function (e.g. DCT2), and TU3 horizontal transform is of constant first basis function (e.g. DCT2).

Figure 26:
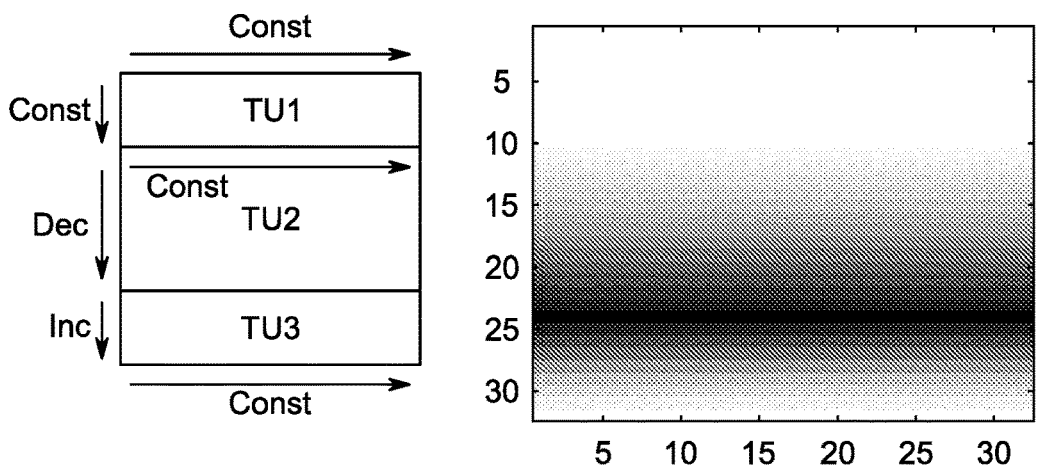

FIG. 26 illustrates, on the left, the transform selection and shows, on the right, the 2D first basis function of all TUs in the case where split type is SPLIT_TT_HOR. The vertical ABT with left edge (ABT_HOR_BOT) can be achieved by using the following transforms:

TU1 vertical transform is of constant first basis function (e.g. DCT2), and TU1 horizontal transform is of constant first basis function (e.g. DCT2).

TU2 vertical transform is of decreasing first basis function (e.g. DCT8), and TU2 horizontal transform is of constant first basis function (e.g. DCT2).

TU3 vertical transform is of increasing first basis function (e.g. DST7), and TU3 horizontal transform is of constant first basis function (e.g. DCT2).

Figure 27:
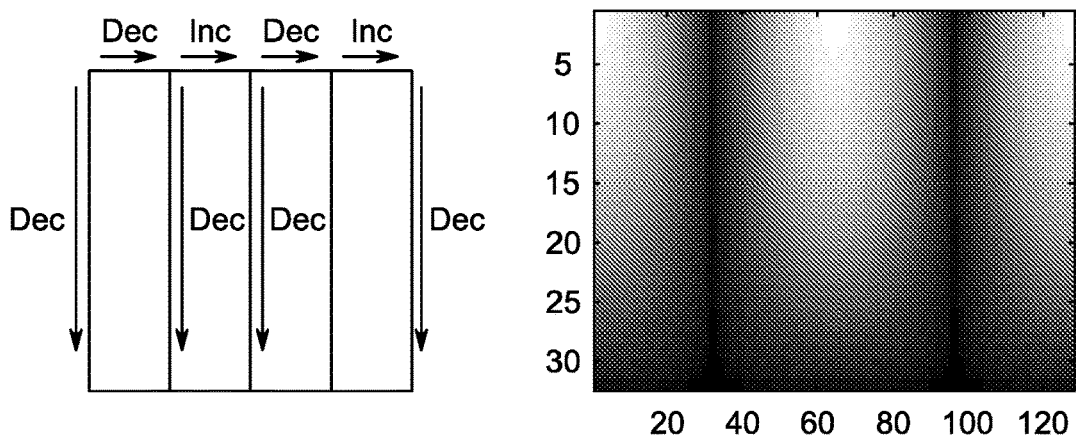

FIG. 27 illustrates, on the left, the transform selection and shows, on the right, the 2D first basis function of all TUs in the case where split type is SPLIT_Q_VER.

TU1 horizontal transform is of decreasing first basis function (e.g. DCT8), and TU1 vertical transform is of decreasing first basis function (e.g. DCT8).

TU2 horizontal transform is of increasing first basis function (e.g. DST7), and TU2 vertical transform is of decreasing first basis function (e.g. DCT8).

TU3 horizontal transform is of decreasing first basis function (e.g. DCT8), and TU3 vertical transform is of decreasing first basis function (e.g. DCT8).

TU4 horizontal transform is of increasing first basis function (e.g. DST7), and TU4 vertical transform is of decreasing first basis function (e.g. DCT8).

Figure 28:
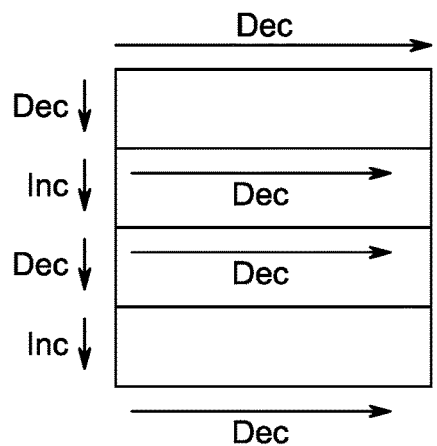
Figure 28:
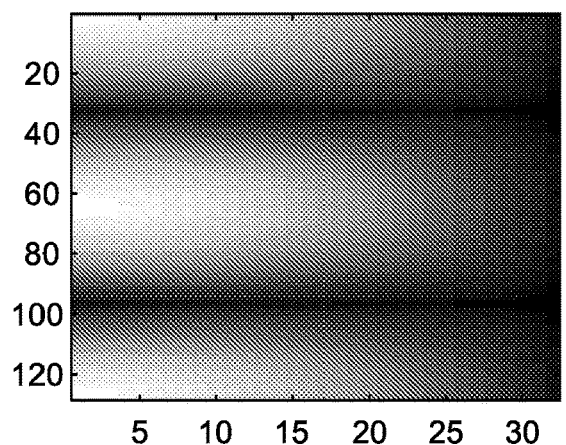

FIG. 28 illustrates, on the left, the transform selection and shows, on the right, the 2D first basis function of all TUs in the case where split type is SPLIT_Q_HOR.

TU1 vertical transform is of decreasing first basis function (e.g. DCT8), and TU1 horizontal transform is of decreasing first basis function (e.g. DCT8).

TU2 vertical transform is of increasing first basis function (e.g. DST7), and TU2 horizontal transform is of decreasing first basis function (e.g. DCT8).

TU3 vertical transform is of decreasing first basis function (e.g. DCT8), and TU3 horizontal transform is of decreasing first basis function (e.g. DCT8).

TU4 vertical transform is of increasing first basis function (e.g. DST7), and TU4 horizontal transform is of decreasing first basis function (e.g. DCT8).

Figure 29:
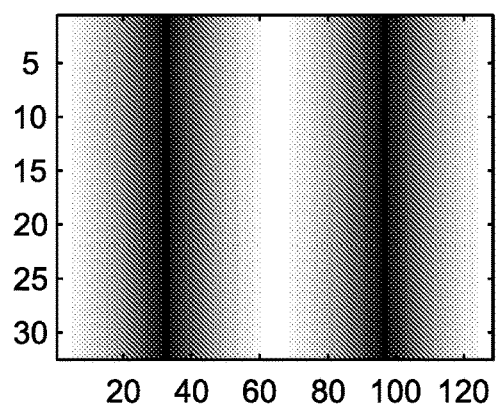
Figure 29:
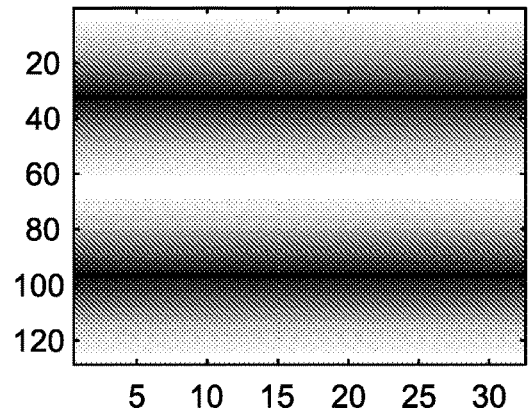

Alternatively, the constant transform can be used for the horizontal transform of the horizontal split and for the vertical transform for the vertical split as shown in FIG. 29.

Figure 30:
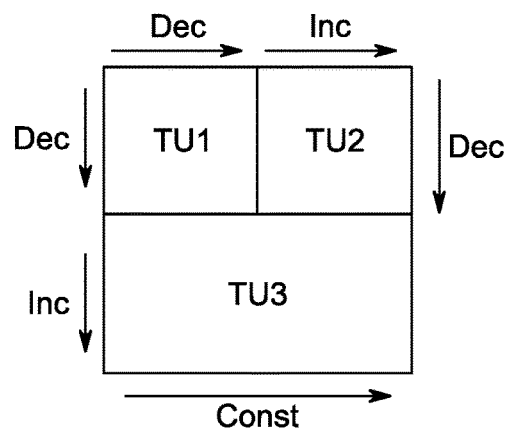
Figure 30:
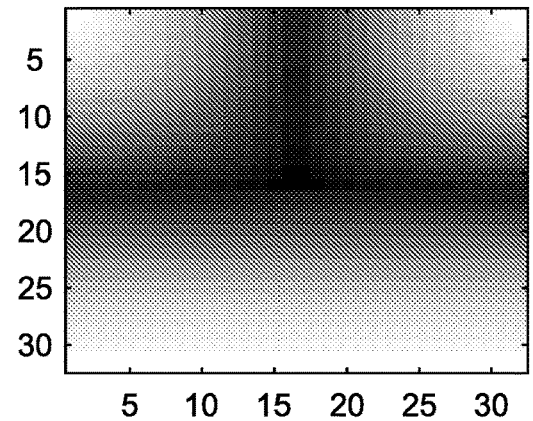

FIG. 30 illustrates, on the left, the transform selection and shows, on the right, the 2D first basis function of all TUs in the case where split type is SPLIT_T_TOP.

TU1 horizontal transform is of decreasing first basis function (e.g. DCT8), and TU1 vertical transform is of decreasing first basis function (e.g. DCT8).

TU2 horizontal transform is of increasing first basis function (e.g. DST7), and TU2 vertical transform is of decreasing first basis function (e.g. DCT8).

TU3 horizontal transform is of increasing first basis function (e.g. DST7), and TU3 vertical transform is of constant first basis function (e.g. DCT2).

Figure 31:
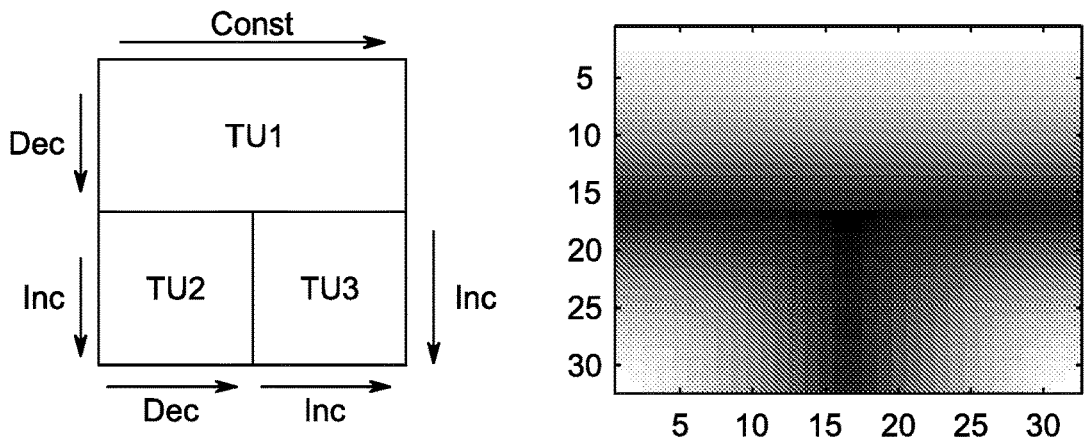

FIG. 31 illustrates, on the left, the transform selection and shows, on the right, the 2D first basis function of all TUs in the case where split type is SPLIT_T_BOTTOM.

TU1 vertical transform is of decreasing first basis function (e.g. DCT8), and TU1 horizontal transform is of constant first basis function (e.g. DCT2).

TU2 vertical transform is of increasing first basis function (e.g. DST7), and TU2 horizontal transform is of decreasing first basis function (e.g. DCT8).

TU3 vertical transform is of increasing first basis function (e.g. DST7), and TU3 horizontal transform is of increasing first basis function (e.g. DST7).

Figure 32:
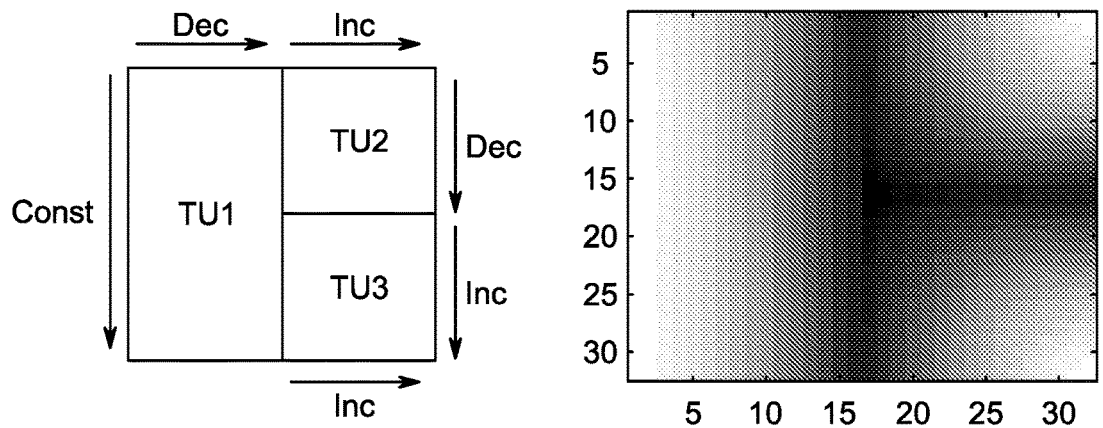

FIG. 32 illustrates, on the left, the transform selection and shows, on the right, the 2D first basis function of all TUs in the case where split type is SPLIT_T_RIGHT.

TU1 horizontal transform is of decreasing first basis function (e.g. DCT8), and TU1 vertical transform is of constant first basis function (e.g. DCT2).

TU2 horizontal transform is of increasing first basis function (e.g. DST7), and TU2 vertical transform is of decreasing first basis function (e.g. DCT8).

TU3 horizontal transform is of increasing first basis function (e.g. DST7), and TU3 vertical transform is of increasing first basis function (e.g. DST7).

Figure 33:
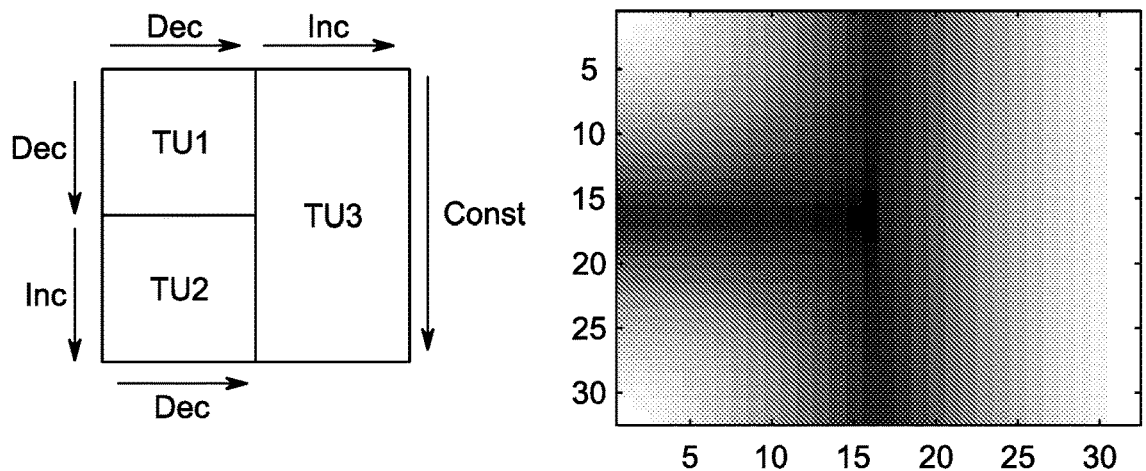

FIG. 33 illustrates, on the left, the transform selection and shows, on the right, the 2D first basis function of all TUs in the case where split type is SPLIT_T_LEFT.

TU1 horizontal transform is of decreasing first basis function (e.g. DCT8), and TU1 vertical transform is of decreasing first basis function (e.g. DCT8).

TU2 horizontal transform is of increasing first basis function (e.g. DST7), and TU2 vertical transform is of constant first basis function (e.g. DCT2).

TU3 horizontal transform is of decreasing first basis function (e.g. DCT8), and TU3 vertical transform is of increasing first basis function (e.g. DST7).

In an alternative embodiment, the TU split can be considered as the same as PU or CU split. For example, if a horizontal binary split occurred in either PU or CU, the corresponding TU split is also horizontal binary and the individual transforms are obtained as explained in above embodiments.

The above embodiments can be extended to the case when recursive split occurs. To do so, the relationships between the transforms of adjacent TU need to comply with the proposed method in this invention. That is, the transforms around the split boundaries need to be taken as complementary to each other, and the transforms other direction are similar or identical. In this way, the invention applies to all possible TU split for both recursive and non-recursive scenarios.

Figure 34:
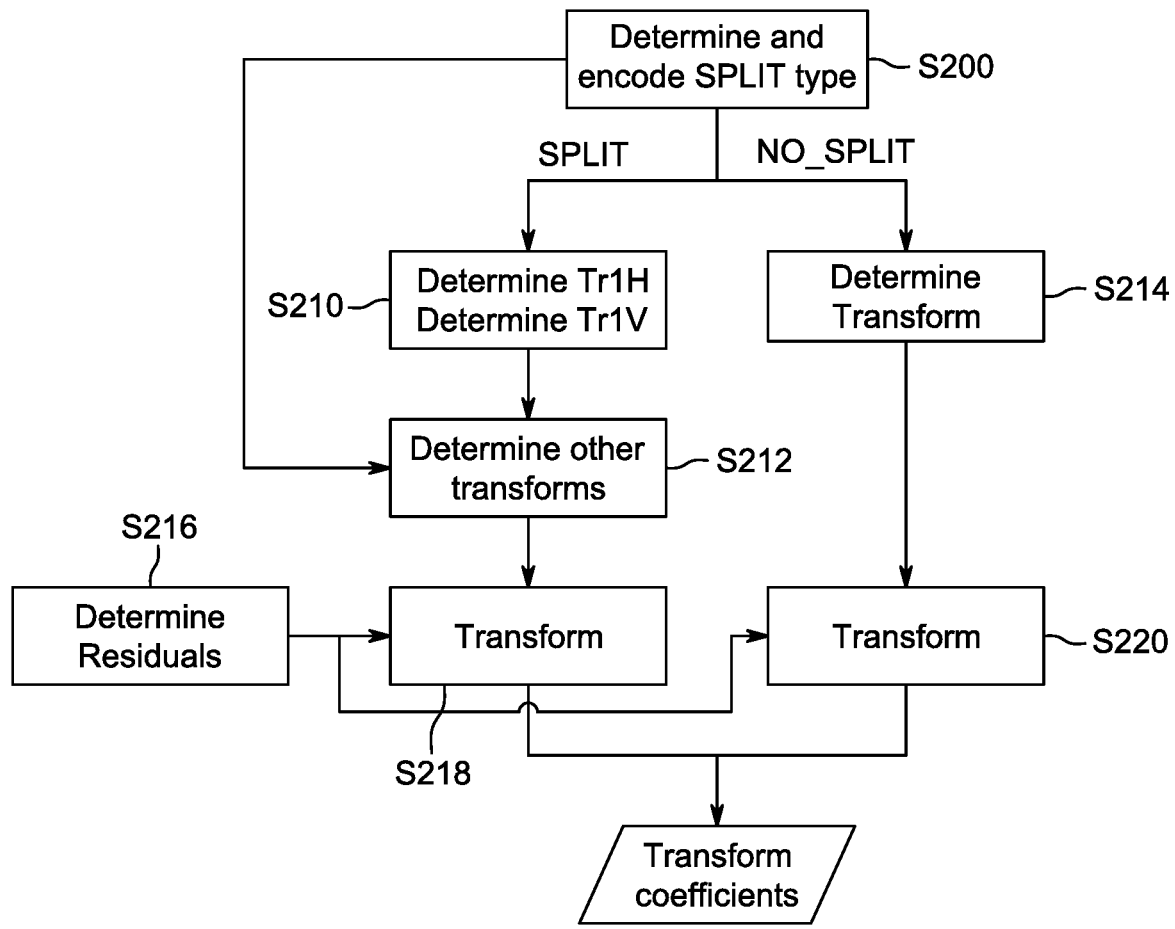
FIGS. 34 and 35 are flowcharts of an encoding method according to various embodiments.

FIG. 34 is a flowchart of an encoding method according to one embodiment. The embodiments and variants disclosed with respect to the decoding method also apply to the encoding method. At S200, a split type is determined and encoded. The split type is usually determined on the encoder side by Rate Distortion Optimization process (RDO). In the case where the block is split, a first horizontal transform Tr1H and a vertical transform Tr1V are determined, e.g. using RDO. More precisely indices identifying these transforms are obtained and encoded (S210). The other transforms used in the block are further derived from at least one of these two transforms (S212). As an example, in S112, the transforms applied parallel to the splitting lines are determined so that they are identical to Tr1H in the case where the splitting line is horizontal). As an example, in S112, the transforms applied parallel to the splitting lines are determined so that they are identical to Tr1V in the case where the splitting line is vertical. As an example, in S112, in the case of FIG. 5(a), Tr2V is determined to be identical to decoded Tr1V. In this embodiment, the other transform Tr2H may also be decoded at S110.

In a variant, the other transforms used in the block are further derived from these two transforms. In this variant, the transforms applied perpendicular to a split line are determined to be complementary. As an example, in S212, in the case of FIG. 5(a), Tr2V is determined to be identical to decoded Tr1V and Tr2H is chosen to be complementary to decoded Tr1H. Therefore, the transforms Tr2H and Tr2V (which are not decoded) are determined from the transforms determined at S210.

In the case where a transform has more than one complementary transform, an additional bit is encoded to indicate which complementary transform is used.

Back to FIG. 12, in the case where the block is not split, a single transform is determined for the whole block (S214).

Once the transforms to be used are determined, residuals determined at S216 are transformed using the determined transformed to obtain the transform coefficients.

Figure 35:
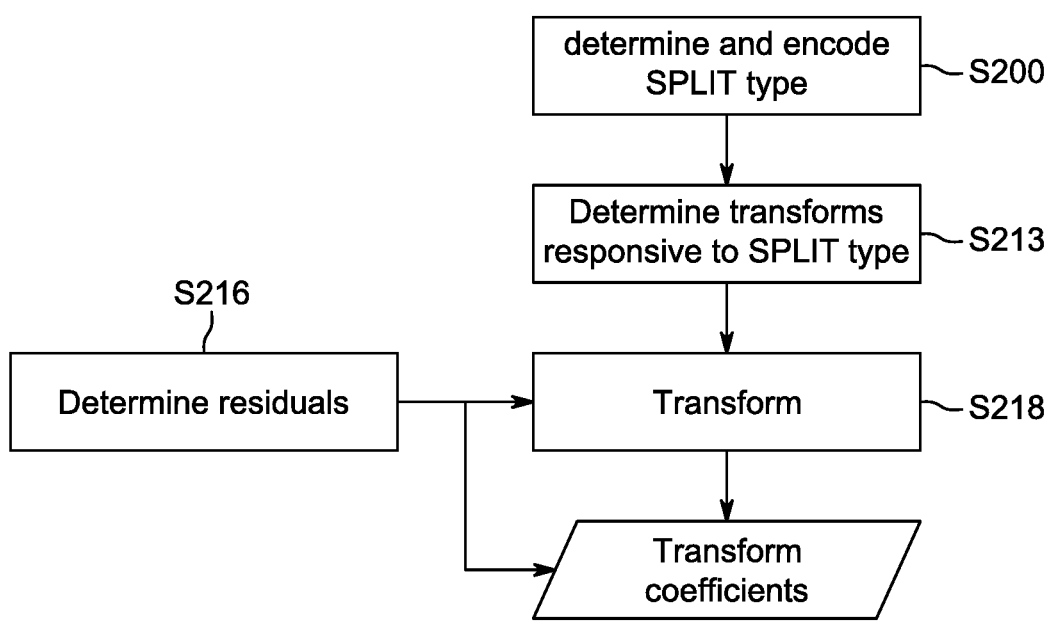

FIG. 35 is a flowchart of a decoding method according to another embodiment. The steps identical to the steps of FIG. 34 are identified with the same numerical references and are not further disclosed. In this embodiment, all the signaling of TUs transforms types are removed, including for the first TU. In S213, the transforms are directly determined responsive to the decoded SPLIT type. This embodiment corresponds to the decoder embodiment of FIG. 14.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 36:
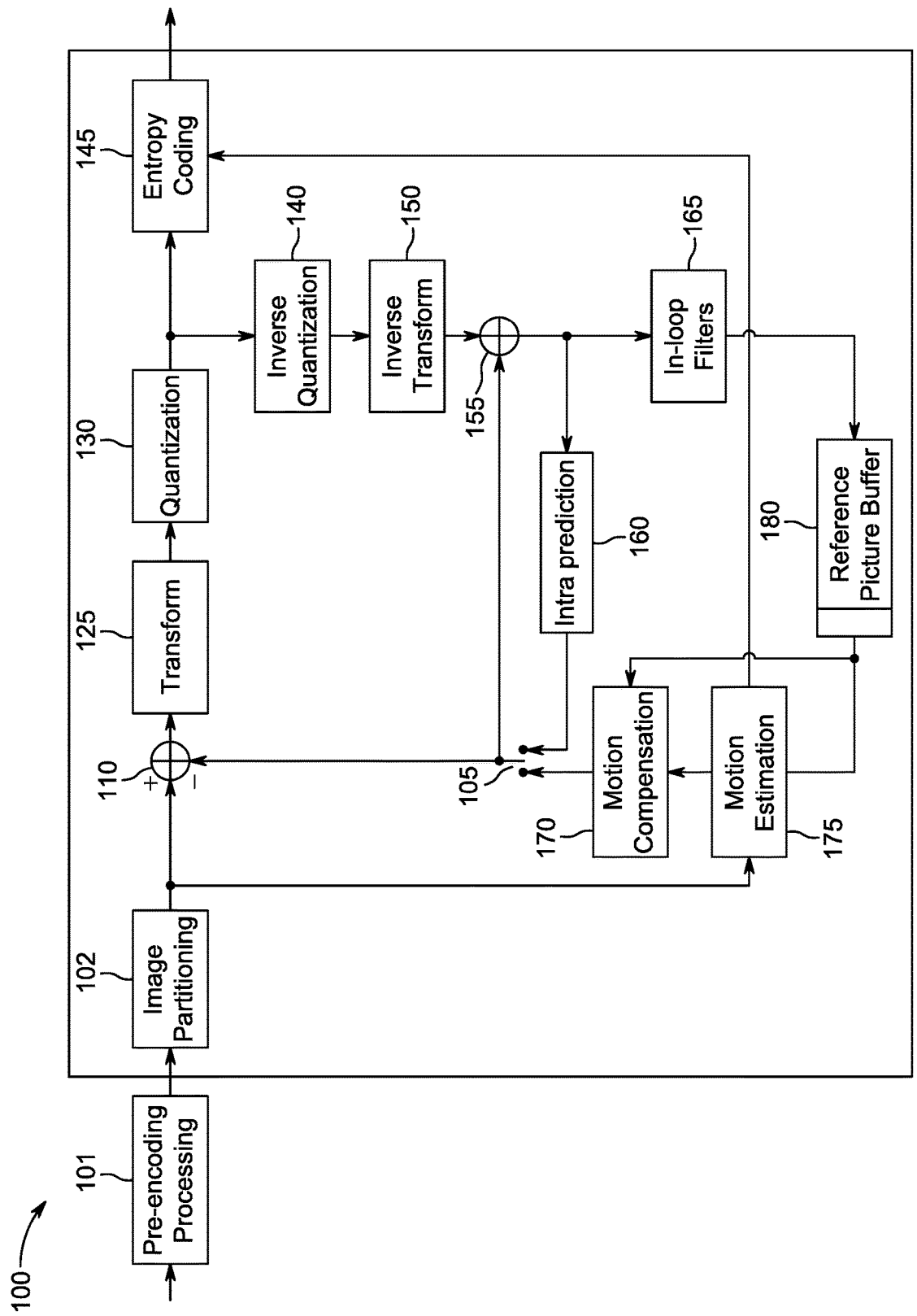
FIG. 36 illustrates a block diagram of a video encoder according to an embodiment.
Figure 37:
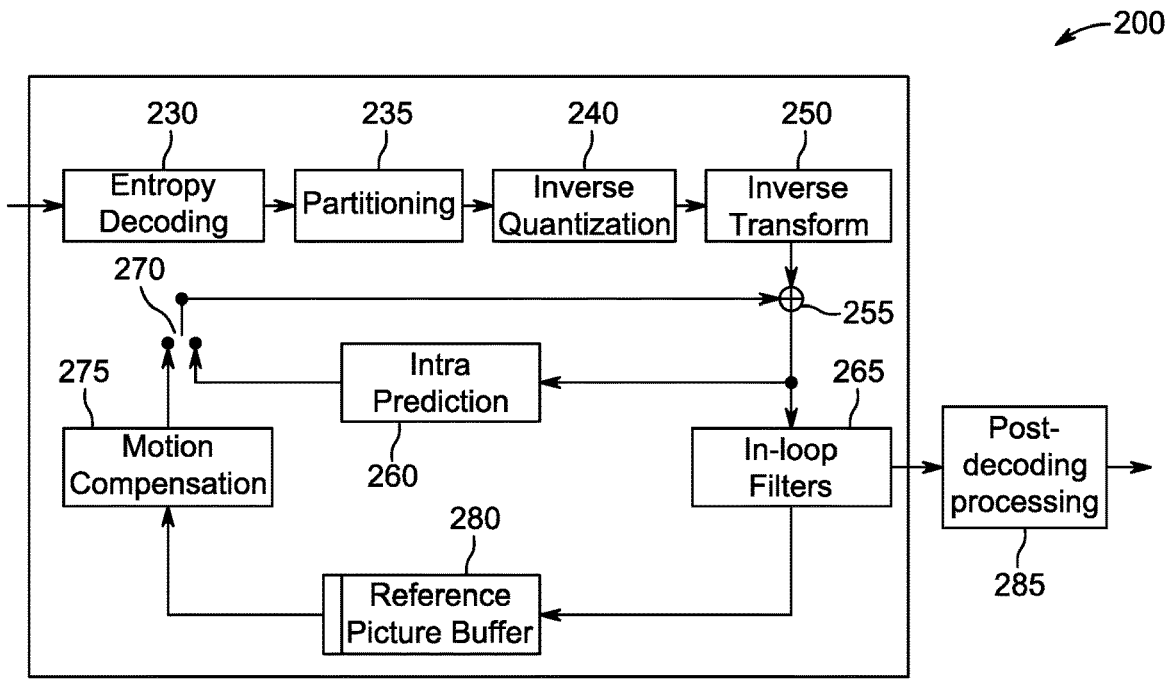
FIG. 37 illustrates a block diagram of a video decoder according to an embodiment.
Figure 38:
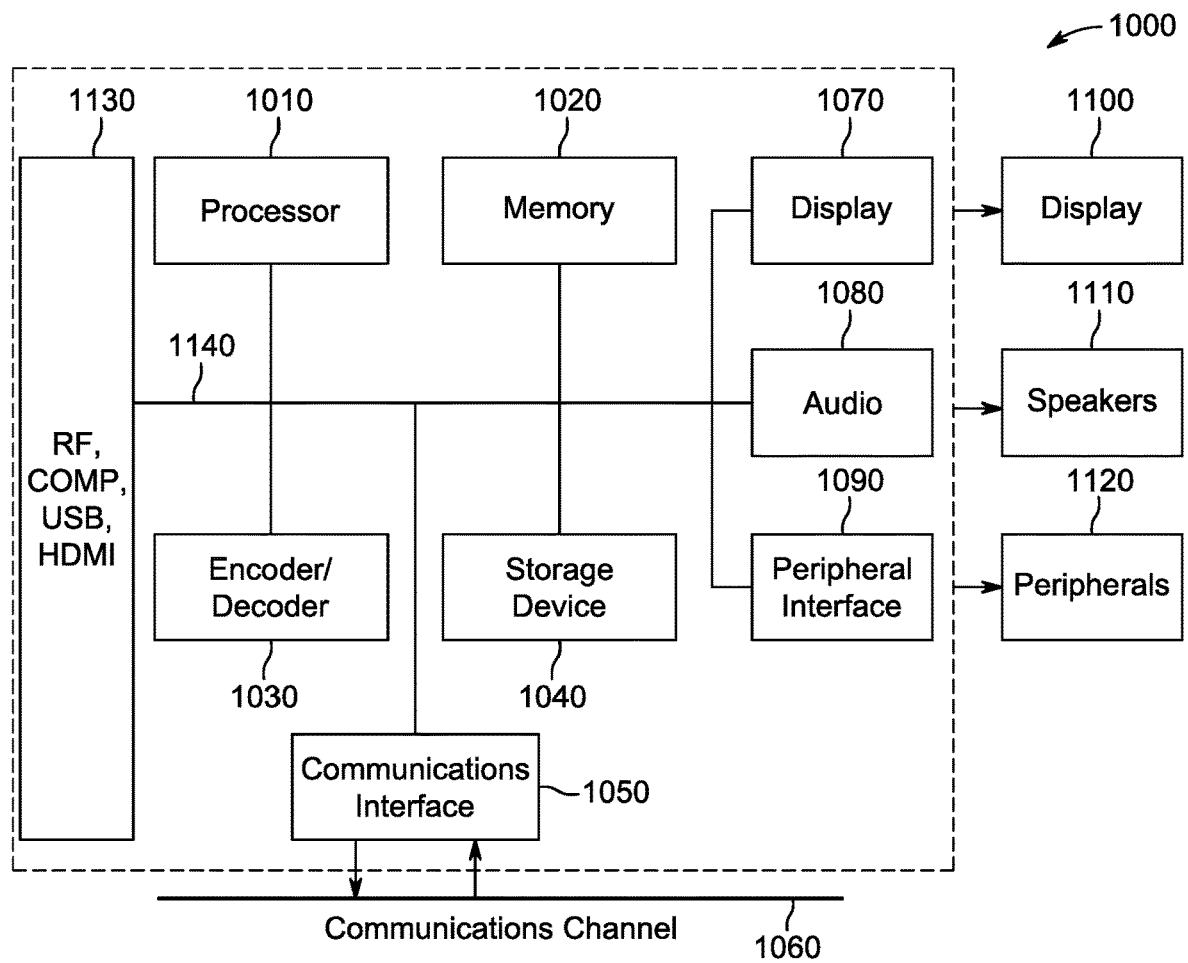
FIG. 38 illustrates a block diagram of an example of a system in which various aspects and embodiments are implemented.

The aspects described and contemplated in this application can be implemented in many different forms. FIGS. 36, 37 and 38 below provide some embodiments, but other embodiments are contemplated and the discussion of FIGS. 36, 37 and 38 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the transform/inverse transform modules (125, 150, 250), of a video encoder 100 and decoder 200 as shown in FIG. 36 and FIG. 37. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application, for example, the number of TUs in which a block is split. The specific values are for example purposes and the aspects described are not limited to these specific values. Also, the type of splits on FIGS. 2-4 are for example purposes. Additional split types may be used. On the other hand a subset of the split types of FIGS. 2-4 may be used.

FIG. 36 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 37 illustrates a block diagram of a video decoder 200. In the decoder 200, a bitstream is decoded by the decoder elements as described below. Video decoder 200 generally performs a decoding pass reciprocal to the encoding pass as described in FIG. 37. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 38 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device).

System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, determining the transforms to be applied on TUs of a block.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, for example, determining the transforms to be applied on TUs of a block.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, for example, MTS flag/index, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between the rate and distortion is usually considered, often given the constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a complementary transform. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments. Features of these embodiments can be provided alone or in any combination across various claim categories and types across various claim categories and types. Further, embodiments can include one or more of the following features, devices, or aspects, alone or in any combination, across various claim categories and types:

- A bitstream or signal that includes one or more of the described syntax elements, e.g. an index indicating a complementary transform, or variations thereof.
- Inserting, in the signaling, syntax elements that enable the decoder to inverse transform decoded coefficients in a manner corresponding to that used by an encoder.
- Creating and/or transmitting and/or receiving and/or decoding a bitstream or signal that includes one or more of the described syntax elements, or variations thereof.
- A TV, set-top box, cell phone, tablet, or other electronic device that performs determination of transforms according to any of the embodiments described.
- A TV, set-top box, cell phone, tablet, or other electronic device that performs determination of transforms according to any of the embodiments described, and that displays (e.g. using a monitor, screen, or other type of display) a resulting image.
- A TV, set-top box, cell phone, tablet, or other electronic device that tunes (e.g. using a tuner) a channel to receive a signal including an encoded image, and performs determination of transforms according to any of the embodiments described.
- A TV, set-top box, cell phone, tablet, or other electronic device that receives (e.g. using an antenna) a signal over the air that includes an encoded image, and performs determination of transform according to any of the embodiments described.
- A decoding method is disclosed that comprises:
- decoding a type of split of a block into transform units;
- determining a transform for each transform unit of said block responsive to said type of split; and
- inverse transforming decoded transform coefficients of said transform units using the determined transforms.
- An encoding method is disclosed that comprises:
- determining and encoding a type of split of a block into transform units;
- determining a transform for each transform unit of said block responsive to said type of split; and
- transforming residuals of said transform units using the determined transforms.

A decoding apparatus is disclosed that comprises one or more processors configured to perform:
    decoding a type of split of a block into transform units;
    determining a transform for each transform unit of said block responsive to said type of split;
    inverse transforming decoded transform coefficients of said transform units using the determined transforms.

An encoding apparatus is disclosed that comprises one or more processors configured to perform:
    determining and encoding a type of split of a block into transform units;
    determining a transform for each transform unit of said block responsive to said type of split;
    transforming residuals of said transform units using the determined transforms.

One or more of the present embodiments also provide a computer readable storage medium having stored thereon instructions for encoding or decoding video data according to at least part of any of the methods described above. One or more embodiments also provide a computer readable storage medium having stored thereon a bitstream generated according to the encoding methods described above. One or more embodiments also provide a method and apparatus for transmitting or receiving the bitstream generated according to the encoding methods described above. One or more embodiments also provide a computer program product including instructions for performing at least part of any of the methods described above.

In a specific embodiment, determining a transform for each transform unit of said block responsive to said type of split comprises:
    decoding a first horizontal transform for a first transform unit of said block and a first vertical transform for a second transform unit of said block; and
    determining transforms of all transform units of said block responsive to one or more of said first horizontal transform and said first vertical transform.

In a specific embodiment, said first and second transform units are one and the same transform unit of said block.

In a specific embodiment, determining transforms of all transform units of said block responsive to one or more of said first horizontal transform and said first vertical transform comprises determining for a transform unit adjacent to another transform unit a horizontal transform identical to a horizontal transform of said another transform unit in the case where a split line between said transform unit and said another transform unit is horizontal.

In a specific embodiment, determining transforms of all transform units of said block responsive to one or more of said first horizontal transform and said first vertical transform comprises determining for a transform unit adjacent to another transform unit a vertical transform that is complementary to a vertical transform of said another transform in the case where a split line between said transform unit and said another transform unit is horizontal, wherein two transforms are complementary in the case where their first basis functions match.

In a specific embodiment, determining transforms of all transform units of said block responsive to one or more of said first horizontal transform and said first vertical transform comprises determining for a transform unit adjacent to another transform unit a vertical transform identical to a vertical transform of said another transform unit in the case where a split line between said transform unit and said another transform unit is vertical.

In a specific embodiment, determining transforms of all transform units of said block responsive to one or more of said first horizontal transform and said first vertical transform comprises determining for a transform unit adjacent to another transform unit a horizontal transform that is complementary to a horizontal transform of said another transform in the case where a split line between said transform unit and said another transform unit is vertical, wherein two transforms are complementary in the case where their first basis function match.

In a specific embodiment, said complementary transform is indicated by an encoded/decoded binary value.

The invention claimed is:

1. A decoding method comprising:
    decoding a type of split of a block into a plurality of sub-blocks;
    determining one or more transforms for sub-blocks of the plurality based on the type of split; and,
    inverse transforming decoded transform coefficients of the sub-blocks using the determined transforms;
    wherein determining one or more transforms for sub-blocks of the plurality based on the type of split comprises:
        decoding an information representative of a first horizontal transform for a first sub-block of the block and an information representative of a first vertical transform for a second sub-block of the block; and
        determining the one or more transforms for sub-blocks the plurality based on one or more of the first horizontal transform and the first vertical transform.

2. The method of claim 1, wherein determining one or more transforms for sub-blocks of the plurality based on one or more of the first horizontal transform and the first vertical transform comprises determining for a sub-block adjacent to another sub-block a second horizontal transform identical to a first horizontal transform of the another sub-block in the case where a split line between the sub-block and the another sub-block is horizontal.

3. The method of claim 1, wherein determining one or more transforms for sub-blocks of the plurality based on one or more of the first horizontal transform and the first vertical transform comprises determining for a sub-block adjacent to another sub-block a second vertical transform that is complementary to a first vertical transform of the another sub-block in the case where a split line between the sub-block and the another sub-block is horizontal, wherein a first transform is complementary with a second transform if a first basis function of the first transform matches a first basis function of the second transform by being in the continuation of the first basis function of the second transform.

4. The method of claim 1, wherein determining one or more transforms for sub-blocks of the plurality based on one or more of the first horizontal transform and the first vertical transform comprises determining for a sub-block adjacent to another sub-block a second vertical transform identical to a first vertical transform of the another sub-block in the case where a split line between the sub-block and the another sub-block is vertical.

5. The method of claim 1, wherein determining one or more transforms for sub-blocks of the plurality based on one or more of the first horizontal transform and the first vertical transform comprises determining for a sub-block adjacent to another sub-block a second horizontal transform that is complementary to a first horizontal transform of the another sub-block in the case where a split line between the sub-block and the another sub-block is vertical, wherein a first transform is complementary with a second transform if a first basis function of the first transform matches a first basis function of the second transform by being in the continuation of the first basis function of the second transform.

6. The method of claim 4, wherein the block is represented by at least one bitstream portion of a bitstream, the complementary transform being indicated by a binary value in the at least one bitstream portion.

7. A decoding apparatus comprising one or more processors configured to perform at least:
- decoding a type of split of a block into a plurality of sub-blocks;
- determining one or more transforms for sub-blocks of the plurality based on the type of split; and,
- inverse transforming decoded transform coefficients of the sub-blocks using the determined transforms;
- wherein, for determining one or more transforms for sub-blocks of the plurality based on the type of split, the one or more processors are further configured to perform:
  - determining and encoding an information representative of a first horizontal transform for a first sub-block of the block and an information representative of a first vertical transform for a second sub-block of the block; and
  - determining one or more transforms for sub-blocks of the plurality based on one or more of the first horizontal transform and the first vertical transform.

8. The apparatus of claim 7, wherein for determining one or more transforms for sub-blocks of the plurality based on one or more of the first horizontal transform and the first vertical transform the one or more processors are further configured for determining for a sub-block adjacent to another sub-block a second horizontal transform identical to a first horizontal transform of the another sub-block in the case where a split line between the sub-block and the another sub-block is horizontal.

9. The apparatus of claim 7, wherein for determining one or more transforms for sub-blocks of the plurality based on one or more of the first horizontal transform and the first vertical transform the one or more processors are further configured for determining for a sub-block adjacent to another sub-block a second vertical transform that is complementary to a first vertical transform of the another sub-block in the case where a split line between the sub-block and the another sub-block is horizontal, wherein a first transform is complementary with a second transform if a first basis function of the first transform matches a first basis function of the second transform by being in the continuation of the first basis function of the second transform.

10. The apparatus of claim 7, wherein for determining one or more transforms for sub-blocks of the plurality based on one or more of the first horizontal transform and the first vertical transform the one or more processors are further configured for determining for a sub-block adjacent to another sub-block a second vertical transform identical to a first vertical transform of the another sub-block in the case where a split line between the sub-block and the another sub-block is vertical.

11. The apparatus of claim 7, wherein for determining one or more transforms for sub-blocks of the plurality based on one or more of the first horizontal transform and the first vertical transform the one or more processors are further configured for determining for a sub-block adjacent to another sub-block a second horizontal transform that is complementary to a first horizontal transform of the another sub-block in the case where a split line between the sub-block and the another sub-block is vertical, wherein a first transform is complementary with a second transform if a first basis function of the first transform matches a first basis function of the second transform by being in the continuation of the first basis function of the second transform.

12. The apparatus of claim 9, wherein the block is represented by at least one portion of a bitstream, the complementary transform being indicated by a binary value in the at least one bitstream portion.

13. An encoding method comprising:
- determining and encoding a type of split of a block into a plurality of sub-blocks;
- determining one or more transforms for sub-blocks of the plurality based on the type of split; and,
- transforming residuals of the sub-blocks using the determined transforms;
- wherein determining one or more transforms for sub-blocks of the plurality based on the type of split comprises:
  - determining and encoding an information representative of a first horizontal transform for a first sub-block of the block and an information representative of a first vertical transform for a second sub-block of the block; and
  - determining the one or more transforms for sub-blocks unit of the plurality based on one or more of the first horizontal transform and the first vertical transform.

14. The method of claim 13, wherein determining one or more transforms for sub-blocks of the plurality based on one or more of the first horizontal transform and the first vertical transform comprises determining for a sub-block adjacent to another sub-block a second horizontal transform identical to a first horizontal transform of the another sub-block in the case where a split line between the sub-block and the another sub-block is horizontal.

15. The method of claim 13, wherein determining one or more transforms for sub-blocks of the plurality based on one or more of the first horizontal transform and the first vertical transform comprises determining for a sub-block adjacent to another sub-block a second vertical transform that is complementary to a first vertical transform of the another sub-block in the case where a split line between the sub-block and the another sub-block is horizontal, wherein a first transform is complementary with a second transform if a first basis function of the first transform matches a first basis function of the second transform by being in the continuation of the first basis function of the second transform.

16. The method of claim 13, wherein determining one or more transforms of for sub-blocks of the plurality based on one or more of the first horizontal transform and the first vertical transform comprises determining for a sub-block adjacent to another sub-block a second vertical transform identical to a first vertical transform of the another sub-block in the case where a split line between the sub-block and the another sub-block is vertical.

17. The method of claim 13, wherein determining one or more transforms for sub-blocks of the plurality based on one or more of the first horizontal transform and the first vertical transform comprises determining for a sub-block adjacent to another sub-block a second horizontal transform that is complementary to a first horizontal transform of the another sub-block in the case where a split line between the sub-block and the another sub-block is vertical, wherein a first transform is complementary with a second transform if a first basis function of the first transform matches a first basis function of the second transform by being in the continuation of the first basis function of the second transform.

18. An encoding apparatus comprising one or more processors configured to perform at least:
- determining and encoding a type of split of a block into a plurality of sub-blocks;
- determining one or more transforms for sub-blocks of the plurality based on the type of split;
- transforming residuals of the sub-blocks using the determined transforms;
- wherein, for determining one or more transform for sub-blocks of the block based on the type of split, the one or more processors are further configured to perform:
  - determining and encoding an information representative of a first horizontal transform for a first sub-block of the block and an information representative of a first vertical transform for a second sub-block of the block; and
  - determining one or more transforms for sub-blocks of the plurality based on one or more of the first horizontal transform and the first vertical transform.

19. The apparatus of claim 18, wherein for determining one or more transforms for sub-blocks of the plurality based on one or more of the first horizontal transform and the first vertical transform the one or more processors are further configured for determining for a sub-block adjacent to another sub-block a second horizontal transform identical to a first horizontal transform of the another sub-block in the case where a split line between the sub-block and the another sub-block is horizontal.

20. The apparatus of claim 18, wherein for determining one or more transforms for sub-blocks of the plurality based on one or more of the first horizontal transform and the first vertical transform the one or more processors are further configured for determining for a sub-block adjacent to another sub-block a second vertical transform that is complementary to a first vertical transform of the another sub-block in the case where a split line between the sub-block and the another sub-block is horizontal, wherein a first transform is complementary with a second transform if a first basis function of the first transform matches a first basis function of the second transform by being in the continuation of the first basis function of the second transform.

* * * * *